United States Patent
Hanyu et al.

(10) Patent No.: US 12,357,015 B2
(45) Date of Patent: Jul. 15, 2025

(54) SOLID FOOD, COMPRESSION-MOLDED FOOD POWDER PRODUCT, SOLID MILK, AND COMPRESSION-MOLDED POWDERED MILK PRODUCT HAVING REDUCED FRACTURE STRESS

(71) Applicant: Meiji Co., Ltd., Tokyo (JP)

(72) Inventors: Keigo Hanyu, Tokyo (JP); Tetsu Kamiya, Tokyo (JP); Koji Yamamura, Tokyo (JP); Jin Ogiwara, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 0 days.

(21) Appl. No.: 17/763,566

(22) PCT Filed: Sep. 3, 2020

(86) PCT No.: PCT/JP2020/033500
§ 371 (c)(1),
(2) Date: Mar. 24, 2022

(87) PCT Pub. No.: WO2021/140700
PCT Pub. Date: Jul. 15, 2021

(65) Prior Publication Data
US 2022/0346431 A1    Nov. 3, 2022

(30) Foreign Application Priority Data

Jan. 6, 2020  (JP) ................ 2020-000569

(51) Int. Cl.
*A23P 10/28*    (2016.01)
*A23C 9/18*    (2006.01)

(52) U.S. Cl.
CPC ............ *A23P 10/28* (2016.08); *A23C 9/18* (2013.01)

(58) Field of Classification Search
CPC ................... A23C 9/18; A23P 10/28
See application file for complete search history.

(56) References Cited

U.S. PATENT DOCUMENTS

| | | |
|---|---|---|
| 2004/0265469 A1 | 12/2004 | Neidlinger et al. |
| 2008/0292770 A1 | 11/2008 | Shibata et al. |
| 2009/0175998 A1 | 7/2009 | Shibata |
| 2010/0260915 A1 | 10/2010 | Young |
| 2014/0017367 A1 | 1/2014 | Rastello-De Boisseson et al. |
| 2017/0188598 A1 | 7/2017 | Shibata |
| 2017/0251686 A1 | 9/2017 | Chaurin et al. |
| 2018/0368432 A1 | 12/2018 | Shibata |

FOREIGN PATENT DOCUMENTS

| | | |
|---|---|---|
| CN | 101437404 | 5/2009 |
| CN | 106998720 | 8/2017 |
| EP | 1965654 | 9/2008 |
| EP | 2665364 | 11/2013 |
| EP | 3185690 | 7/2017 |
| JP | 2000-95674 | 4/2000 |
| JP | 2007-307592 | 11/2007 |
| JP | 2008-290145 | 12/2008 |
| JP | 2012-196228 | 10/2012 |
| RU | 2 307 509 | 10/2007 |
| RU | 2017 110 258 | 10/2018 |
| WO | 2006/004190 | 1/2006 |
| WO | 2007/077970 | 7/2007 |
| WO | 2012/099471 | 7/2012 |
| WO | 2016/032320 | 3/2016 |

OTHER PUBLICATIONS

International Search Report dated Nov. 10, 2020 in International (PCT) Application No. PCT/JP2020/033500.
Extended European Search Report dated Jul. 9, 2021 issued in European Application No. 20194326.3.
Written Opinion dated Nov. 10, 2020 issued in PCT Application No. PCT/JP2020/033500, with English translation.
Office Action and Search Report issued Dec. 13, 2023 in Russian Patent Application No. 2022118213, with English translation, 14 pages.
Zurabishvili, G.G., "Tableting of food powdery materials", Moscow 1993, pp. 12-13, Table 1, with English translation, 6 pages.

*Primary Examiner* — Jeffrey P Mornhinweg
(74) *Attorney, Agent, or Firm* — WENDEROTH, LIND & PONACK, L.L.P.

(57) ABSTRACT

A solid food is a solid food having a solid form obtained by compression molding and hardening a food powder, in which a specific surface area voxel ratio of the solid food is configured such that an average value A from a surface of the solid food to a depth of 2 mm is smaller than an average value C from a depth of 4 mm from the surface of the solid food to a depth of 6 mm, and a rate of decrease (C−A)/C× 100 of the specific surface area voxel ratio obtained by dividing a difference (C−A) between the average value C and the average value A by the average value C is 9.5% or less.

6 Claims, 6 Drawing Sheets

SOLID FOOD, COMPRESSION-MOLDED FOOD POWDER PRODUCT, SOLID MILK, AND COMPRESSION-MOLDED POWDERED MILK PRODUCT HAVING REDUCED FRACTURE STRESS

TECHNICAL FIELD

The present invention relates to a solid food, a compression molded body of a food powder, a solid milk, and a compression molded body of a powdered milk.

BACKGROUND ART

As a solid food, a solid milk obtained by compression molding a powdered milk is known (see PTL 1). This solid milk is required to have such solubility that it quickly dissolves when placed in warm water. At the same time, transportation suitability, that is resistance to breakage that prevents breakage such as cracking or collapse from occurring during transportation or carrying, is also required. The solubility of the solid milk can be enhanced by increasing a porosity thereof, but an increase in porosity causes a decrease in resistance to breakage. Thus, from viewpoints of solubility and resistance to breakage, an optimal porosity has been set. Incidentally, "porosity" means a proportion of the volume occupied by pores in the bulk volume of a powder.

As a tablet press for compression molding a powder including a powdered milk, a rotary tablet press is known (see PTL 2). In addition, a tablet press in which a slide plate having two die hole positions is horizontally reciprocated is known (see PTL 3). In the tablet press of PTL 3, two discharge zones are provided with a compression molding zone interposed therebetween. The slide plate is configured to be reciprocated between a first position and a second position. The first position is a position in which one die hole position is set in the compression molding zone, while the other die hole position is set in one discharge zone. The second position is a position in which the other die hole position is set in the compression molding zone, while one die hole position is set in the other discharge zone. A lower punch and an upper punch are allowed to enter each of a plurality of die holes of the die hole position set in the compression molding zone to compression mold a powder, and a compressed body of the powder obtained by compression molding the powder is extruded from each of the plurality of die holes of the die hole position set in the discharge zone.

The solid milk is formed by compression molding a powdered milk and then hardening the compression molded body. In the present specification, a product before hardening obtained by compression molding the powdered milk is referred to as a compression molded body of the powdered milk, and a product obtained by hardening the compression molded body of the powdered milk is referred to as a solid milk. In addition, a product before hardening obtained by compression molding a food powder is referred to as a compression molded body of the food powder, and a product obtained by hardening the compression molded body of the food powder is referred to as a solid food.

CITATION LIST

Patent Literature

PTL 1: WO 2006/004190
PTL 2: JP-A-2000-95674
PTL 3: JP-A-2007-307592

SUMMARY OF THE INVENTION

Technical Problem

In the compressed body of the powder, in a case where the same porosity is maintained, the higher the compression speed, the lower the hardness, and thus resistance to breakage is lowered. Therefore, in order to increase the hardness of the compressed body of the powder while maintaining a predetermined porosity to enhance resistance to breakage, it is considered to be useful to reduce the compression speed. However, there has been a problem in that the compression of a powder at a reduced compression speed leads to a decrease in the production rate of a compressed body of the powder, resulting in poor production efficiency. That is, in the related art, high solubility at a high porosity, high resistance to breakage, and high productivity are not achieved simultaneously.

The present invention has been accomplished against the above background, and an object thereof is to provide a solid food, a compression molded body of a food powder, a solid milk, and a compression molded body of a powdered milk which can be produced with improved production efficiency while increasing hardness to secure resistance to breakage during transportation.

Solution to Problem

A solid food of the present invention is a solid food having a solid form obtained by compression molding a food powder, in which a specific surface area voxel ratio of the solid food configured such that an average value A from a surface of the solid food to a depth of 2 mm is smaller than an average value C from a depth of 4 mm from the surface of the solid food to a depth of 6 mm, and a rate of decrease $(C-A)/C \times 100$ of the specific surface area voxel ratio obtained by dividing a difference $(C-A)$ between the average value C and the average value A the average value C is 9.5% or less.

A compression molded body of a food powder of the present invention is a compression molded body of a food powder having a solid form obtained by compression molding a food powder, in which a specific surface area voxel ratio of the compression molded body of the food powder is configured such that an average value A from a surface of the compression molded body of the food powder to a depth of 2 mm is smaller than an average value C from a depth of 4 mm from the surface of the compression molded body of the food powder to a depth of 6 mm, and a at of decrease $(C-A)/C \times 100$ of the specific surface area voxel ratio obtained by dividing a difference $(C-A)$ between the average value C and the average value A by the average value C is 1.8% or less.

A solid milk of the present invention is a solid milk having a solid form obtained by compression molding a powdered milk, in which a specific surface area voxel ratio of the solid milk is configured such that an average value A from a surface of the solid milk to a depth of 2 mm is more than 0.353 and less than 0.391, and an average value C from a depth of 4 mm from the surface of the solid milk to a depth of 6 mm is more than 0.390 and less than 0.444 and is larger than the average value A.

A compression molded body of a powdered milk of the present invention is a compression molded body of a powdered milk having a solid form obtained by compression molding a powdered milk, in which a specific surface area voxel ratio of the compression molded body of the powdered milk is configured such that an average value A from a surface of the compression molded body of the powdered milk to a depth of 2 mm is more than 0.406 and less than 0.420, and an average value C from a depth of 4 mm from the surface of the compression molded body of the powdered milk to a depth of 6 mm is more than 0.414 and less than 0.434 and is larger than the average value A.

Advantageous Effects of the Invention

According to the present invention, in the solid food, average value A of the specific surface area voxel ratio from the surface of the solid food to a depth of 2 mm and the average value C of the specific surface area voxel ratio from a depth of 4 mm from the surface of the solid food to a depth of 6 mm are configured such that is smaller than C and a value of the rate of decrease (C−A)/C×100 of the specific surface area voxel ratio is 9.5% or less. The solid food having such a specific surface area voxel ratio profile can be produced by a first compression at a first compression speed and second compression, which is performed subsequently to the first compression, at a second compression speed that is lower than then first compression speed, and can be produced with improved production efficiency as compared to the case of only the compression at the second compression speed. In such a solid food, by performing the second compression at the second compression speed after the first compression at the first compression speed, the hardness in the state before hardening is increased so that resistance to breakage can be secured.

According to the present invention, in the compression molded body of the food powder, the average value A of the specific surface area voxel ratio from the surface of the compression molded body of the food powder to a depth of 2 mm and the average value C of the specific surface area voxel ratio from a depth of 4 mm from the surface of the compression molded body of the food powder to a depth of 6 mm are configured such that A is smaller than C and a value the rate of decrease (C−A)/C×100 of the specific surface area voxel ratio is 1.8% or less. The compression molded body of the food powder having such a specific surface area voxel ratio profile can be produced by a first compression at a first compression speed and a second compression, which is performed subsequently to the first compression, at second compression speed that is lower than the first compression speed, and can be produced with improved production efficiency as compared to the case of only the compression at the second compression speed. In such a compression molded body of the food powder, by performing the second compression at the second compression speed after the first compression at the first compression speed, the hardness is increased so that resistance to breakage can be secured.

According to the present invention, in the solid milk, the average value A of the specific surface area voxel ratio from the surface of the solid milk to a depth of 2 mm is more than 0.353 and less than 0.391, and the average value C of the specific surface area voxel ratio from a depth of 4 mm from the surface to a depth of 6 mm is more than 0.390 and less than 0.444 and is larger than the average value A. The solid milk having such a specific surface area voxel ratio profile can be produced by a first compression at a first compression speed and a second compression, which is performed subsequently to the first compression, at a second compression speed that is lower than the first compression speed, and can be produced with improved production efficiency as compared to the case of only the compression at the second compression speed. In such a solid milk, by performing the second compression at the second compression speed after the first compression at the first compression speed, the hardness in the state before hardening is increased so that resistance to breakage can be secured.

According to the present invention, in the compression molded body of the powdered milk, the average value A of the specific surface area voxel ratio from the surface of the compression molded body of the powdered milk to a depth of 2 mm is more than 0.406 and less than 0.420, and the average value C of the specific surface area voxel ratio from a depth of 4 mm from the surface to a depth of 6 mm is more than 0.414 and less than 0.434 and is larger than the average value A. The compression molded body of the powdered milk having such a specific surface area voxel ratio profile can be produced by a first compression at a first compression speed and a second compression, which is performed subsequently to the first compression, at a second compression speed that is lower than the first compression speed, and can be produced with improved production efficiency as compared to the case of only the compression at the second compression speed. In such a compression molded body of the powdered milk, by performing the second compression at the second compression speed after the first compression at first compression speed, the hardness is increased so that resistance to breakage can be secured.

Hereinafter, embodiments of the present invention will be described. However, the embodiment to be described below is merely an example and can be appropriately modified within an apparent range for those skilled in the art.

First Embodiment (Configuration of Solid Milk 10S)

Figure 1:
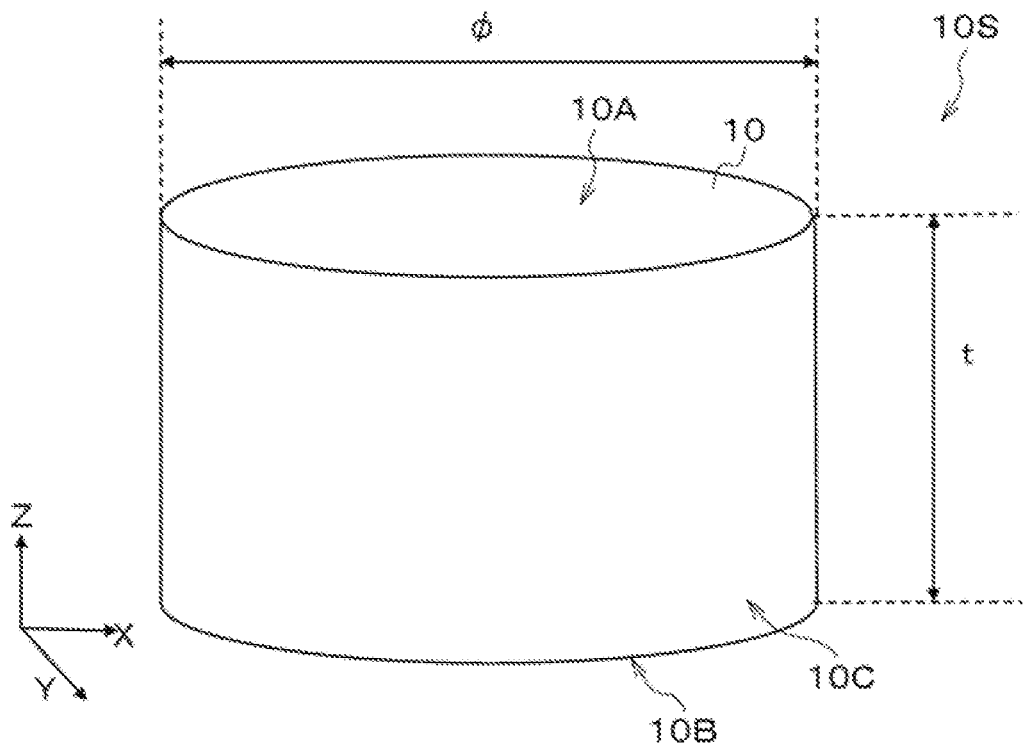
FIG. 1 is a perspective view of a solid milk according to a first embodiment.
Figure 2:
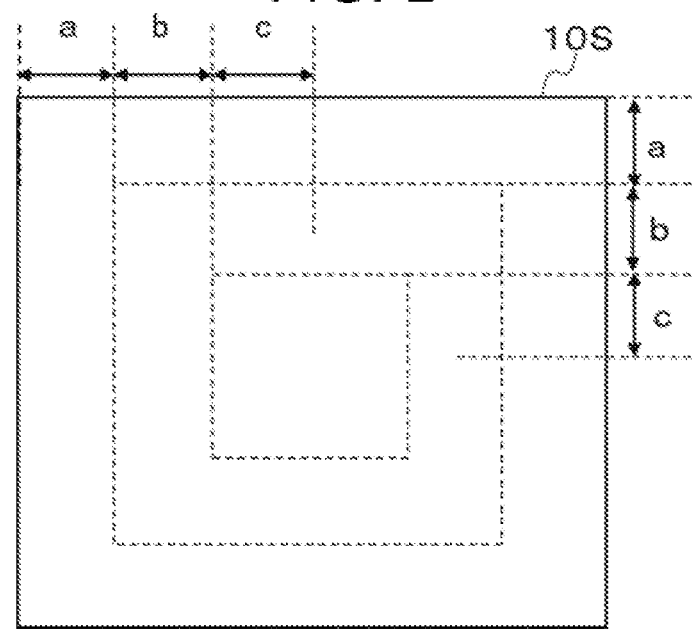
FIG. 2 is a central longitudinal cross-sectional view of the solid milk of FIG. 1.

FIG. 1 is a perspective view of a solid milk 10S according to the present embodiment FIG. 2 is a central longitudinal cross-sectional view of the solid milk 10S of FIG. 1.

The solid milk 10S has a body 10 having a solid form obtained by compression molding a powdered milk. The body 10 has a first face 10A that is flat and parallel to an XY plane and a second face 10B that is flat and parallel the XY plane. The first face 10A and the second face 10B are faces facing each other back to back. The shape of the body 10 is determined depending on the shape of a mold (a die of a tablet press) used in compression molding, but is not particularly limited as long as it is a shape having a certain degree of dimension (size, thickness, angle). The schematic shape of the body 10 is a round column shape, an elliptical column shape, a cubic shape, a rectangular parallelepiped shape, a plate shape, a polygonal column shape, a polygonal pyramid shape, a polyhedron shape, or the like. From the viewpoint of simplicity of molding, convenience of transportation, or the like, a round column shape, an elliptical column shape, and a rectangular parallelepiped shape are preferred. The schematic shape of the body 10 of the solid milk 10S illustrated in FIGS. 1 and 2 is a round column shape having a dimension of a diameter ϕ×thickness t (see FIG. 1) and the body 10 has a lateral face 10C that is parallel to a Z axis. A corner part configured by the first face 10A and the lateral face 10C is not a tapered shape which is chamfered but may be chamfered. In the case of the corner part being chamfered, the situation of the solid milk 10S being fractured when being transported, etc. can be suppressed.

A surface is a face that forms the outside of a material. A surface layer is a layer near the surface (vicinity of the surface) including the surface. For example, the surface layer is a layer formed by compression molding a Powdered milk and further hardening through the hardening treatment. The surface layer of the present embodiment is a harder layer than the inner part. Herein, a state in which the surface layer a harder layer than the inner part indicates that a power necessary for peeling off a thin layer is larger in the surface than in the inner part.

In the solid milk 10S of the present embodiment, a specific surface area voxel profile in A depth direction from the surface to the inner part is as follows. As illustrated in FIG. 2, in the cross-section of the solid milk 10S, a region from the surface of the solid milk 10S to a depth of 2 mm is designated as a region a, a region from a depth of 2 mm from the surface the solid milk 10S to a depth of 4 mm is designated as a region b, and a region from a depth of 4 mm from the surface of the solid milk 10S to a depth of 5 mm is designated as a region c. An average value of the specific surface area voxel ratio in the region a is more than 0.353 and less than 0.391. In addition, the average value C of the specific surface area voxel ratio in the region c is than 0.390 and less than 0.444. The average value C of the specific surface area voxel ratio the region c is larger than the average value A of the specific surface area voxel ratio in the region a. The average value B of the specific surface area voxel ratio of the region b is a value from about the average value A of the specific surface area voxel ratio of the region a to about the average value C of the specific surface area voxel ratio of the region c.

In the compression molded body of the powdered milk the present embodiment, the specific surface area voxel ratio profile in the depth direction from the surface to the inner part is as follows. An average value A of the specific surface area voxel ratio in the region a is more than 0.406 and less than 0.420. In addition, the average value C of the specific surface area voxel ratio in the region c is more than 0.414 and less than 0.434. The average value C of the specific surface area voxel ratio in the region c is larger than the average value A of the specific surface area voxel ratio in the region a. The average value of the specific surface area voxel ratio of the region b is a value from about the as age value A of the specific surface area voxel ratio of the region a to about the average value C of the specific surface area voxel ratio of the region c.

One or two or more holes penetrating the body 10 from the first face 10A to reach to the second face 10B may be provided in the body 10. The shape of the hole is an oval shape, a rounded rectangle shape, an elliptical shape, a round shape, a rectangular shape, square shape, or other polygonal shapes, for example, in a cross-section parallel to the XY plane. The position of the hole is preferably a position without significant unevenness when viewed from the central position of the first face 10A, and for example, the position is an arrangement that is point-symmetric with respect to the central position of the first face 10A or an arrangement that is line-symmetric with respect to a line parallel to an X axis passing through the center of the first face 10A or a line parallel to a Y axis. In the case of providing one hole, the hole is provided, for example, at the center of the first face 10A. In the case of providing a hole, the edge of the hole may be a tapered inclined face. Incidentally, in the case of providing a hole, the inner surface of the hole is a surface harder than the inner part similarly to the first face 10A.

The components of the solid milk 10S are basically the same as components of the powdered milk as a raw material. The components of the solid milk 10S are, for example, fats, proteins, sugars, minerals, vitamins, moisture, and the like.

The powdered milk is produced from a liquid type milk (liquid milk) containing milk components (for example, components of a cow milk). The milk components are, for e ample, a raw milk (whole milk), a skimmed milk, cream, and like. The moisture content ratio of the liquid milk is, for example, 40% by weight to 95% by weight. The moisture content ratio of the powdered milk is, for example, 1% by weight to 4% by weight. Nutritional components to be described below may be added to the powdered milk. The powdered milk may be a whole powdered milk, a powdered skimmed milk, a creamy powder as long as it is suitable for producing the solid milk 10S. It is preferable that the content ratio of fit in the powdered milk is, for example, 5% by weight to 70% weight.

The milk components which are used as a raw material for the powdered milk are, for example, derived from a raw milk. Specifically, the milk components are derived from a raw milk of cows (Holstein cows, Jersey cows, and the like), goats, sheep, buffalos, and the like. Fat components are contained in the raw milk, but a milk in which a part or the whole of the fat components are removed by centrifugal separation or the like to adjust the content ratio of fat may be used.

Further, the milk components which may be used as raw materials for the powdered milk are, for example, vegetable milk derived from a plant. Specific examples thereof include those derived from plants such as soybean milk, rice milk, coconut milk, almond milk, hemp milk, and peanut milk. Fat components are contained in the vegetable milk, but a milk in which a part or the whole of the fat components are removed by centrifugal separation or the like to adjust the content ratio of fat may be used.

The nutritional components which are used as a raw material for the powdered milk are, for example, fats, proteins, sugars, minerals, vitamins, and the like. One kind or two or more kinds of these may be added.

Proteins which may be used as a raw material for the powdered milk are, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins (α-lactoalbumin, β-lactoglobulin, and the like), for example, whey protein concentrate (WPC), whey protein isolate (WPI), and the like. Animal proteins are, for example, egg protein. Vegetable proteins are, for example, soybean protein and wheat protein. Examples of the amino acids include taurine, cystine, cysteine, arginine, and glutamine.

Fats (oils and fats) which may be used as a raw material for the powdered milk are animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Sugars which may be used as a raw material for the powdered milk are, for example, oligosaccharides, monosaccharides, polysaccharides, artificial sweeteners, and the like. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like. Incidentally, instead of or in addition to artificial sweeteners of sugars, non-sugar artificial sweeteners may be used.

Minerals which may be used as a raw material for the powdered milk are, for example, sodium, potassium, calcium, magnesium, iron, copper, zinc, and the like. One kind or two or more kinds of these may be added. Incidentally, instead of or in addition to sodium, potassium, calcium, magnesium, iron, copper, and zinc of minerals, either or both of phosphorus and chlorine may be used.

In the solid milk 10S, a large number of pores (for example, fine pores) generated when a powdered milk as a raw material for the solid milk 10S is compression molded exist. These plurality of pores are dispersed (distributed) corresponding to the specific surface area voxel ratio profile in the depth direction of the solid milk 10S. As the pore is larger (wider), a solvent such as water is easy to penetrate, so that the solid milk 10S can be rapidly dissolved. On they other hand, when the pore is too large, the hardness of the solid milk 10S may be reduced or the surface of the solid milk 10S may become coarse. The dimension (size) of each pore is, for example, 10 μm to 500 μm.

For the measurement of the specific surface area voxel ratio, a high-resolution 3D X-ray microscope (three-dimensional X-ray CT apparatus) (format: nano 3DX) manufactured by Rigaku Corporation can be used. As for the measurement environment of the specific surface area voxel ratio, the measurement needs to be performed within a range in which measurement accuracy is maintained, and for example, the measurement is performed at a temperature of 20° C.±5° C. and a humidity of 30% RH±5% RH.

The solid milk 10S is required to have a certain degree of solubility to a solvent such as water.

The solubility can be evaluated, for example, by a time for the solid milk 10S to completely dissolve or the amount of non-dissolved residues at a predetermined time when the solid milk 10S as a solute and water as a solvent are prepared to have a predetermined concentration.

It is preferable that the solid milk 10S has a predetermined range of hardness. The hardness can be measured by a known method. In the present specification, the hardness is measured by using a load cell tablet hardness tester. The solid milk 10S having a round column shape is placed on a load cell tablet hardness tester while the second face of the solid milk is set to a bottom face, a portion of the lateral face 10C that is the most convex in a +Y side and a portion of the lateral face 10C that is the most convex in a −Y side are fixed to a fracture terminal of the hardness tester and a wall face of the hardness tester facing the fracture terminal, respectively, the fixed face is pushed by the fracture terminal at a constant speed in a direction in which the YZ plane is a fracture surface in a −Y direction of FIG. 1, and a loading [N] when fracturing the solid milk 10S is regarded as a hardness (tablet hardness) [N] of the solid milk 10S. For example, a load cell tablet hardness tester (PORTABLE CHECKER PC-30) manufactured by OKADA SEIKO CO., LTD is used. As the fracture terminal, a fracture terminal for tablet hardness measurement is used. The speed of the fracture terminal pushing the solid milk 10S is set to 0.5 mm/s. The measurement of the hardness is not limited to the solid milk 10S and can also be applied to the case of measuring the hardness of a compression molded body of the powdered milk (unhardened solid milk 10S) described below. Regarding the hardness measured as described above, in order to avoid the situation of the solid milk 10S being fractured when the solid milk 10S is transported, etc. as much as possible, the hardness of the solid milk 10S is preferably 20 N or more and more preferably 40 N or more. On the other hand, since solubility of the solid milk 10S deteriorates when the hardness of the solid milk 10S is too high, the hardness of the solid milk 10S is preferably 100 N or less and more preferably 70 N or less.

Figure 3:
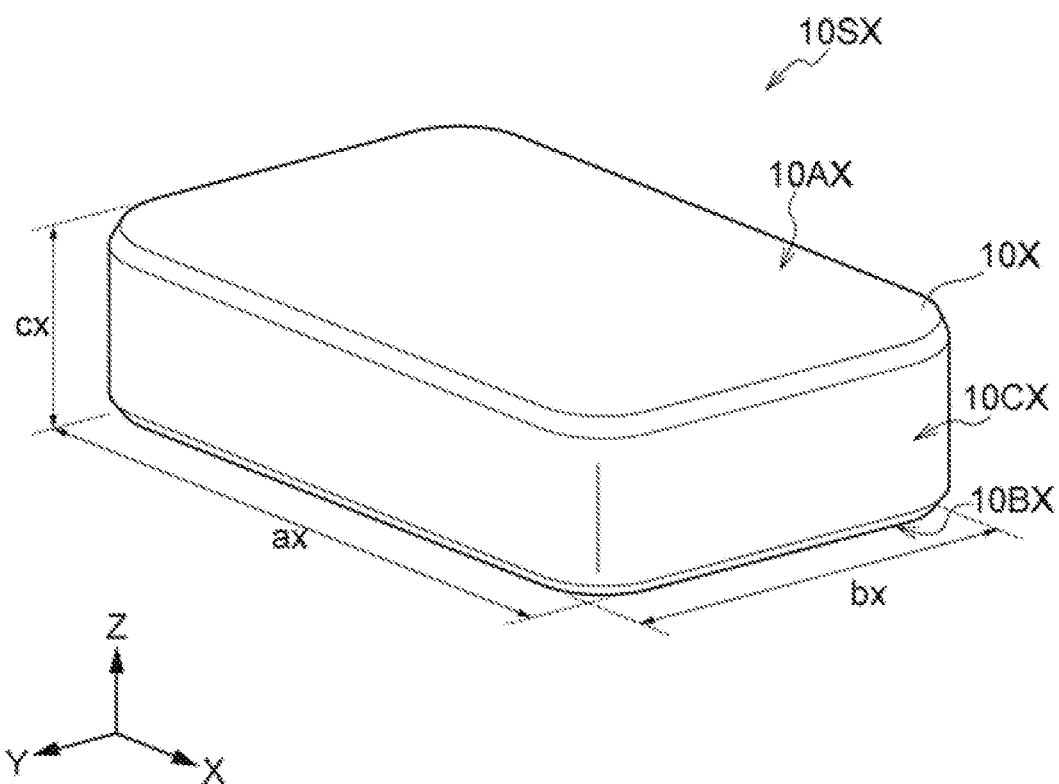
FIG. 3 is a perspective view of a solid milk in a case of a rectangular parallelepiped shape according to the first embodiment.

FIG. 3 is a perspective view of a solid milk 10SX in a case of a rectangular parallelepiped shape according to the present embodiment. A schematic shape of a body 10X of the solid milk 10SX shown in FIG. 3 is a rectangular parallelepiped shape having a dimension of ax×bx×cx. In a case where the solid milk has a rectangular parallelepiped shape, the solid milk 10SX having the rectangular parallelepiped shape is placed on the load cell tablet hardness tester while a second face 10BX of the solid milk 10SX is set to a bottom face, is fixed by using one face parallel to an XZ plane and one face parallel to a YZ plane of a lateral face 10CX, and is pushed by a fracture terminal of the hardness tester at a constant speed from a side, which is not fixed and is parallel to the XZ plane, of the lateral face 10CX in a minor axis direction of a first face 10AX (Y-axis direction in FIG. 3) toward a direction in which the YZ plane is a fracture face, and a loading [N] when fracturing the solid milk 10SX is regarded as a hardness (tablet hardness) [N] of the solid milk 10SX. In the case of the solid milk 10SX, the measurement point is selected from a point at which distances between the first face 10AX and the second face 10BX on the line segment intersecting a plane parallel to the YZ plane, in which distances between a pair of the YZ planes of the lateral face 10CX are equal, with the XZ plane of the lateral face 10CX, are equal. For example, a load cell tablet hardness tester (PORTABLE CHECKER PC-30) manufactured by OKADA SEIKO CO., LTD. is used. The fracture terminal built in the hardness tester has a contact face being in contact with the solid milk 10SX. The contact face of the fracture terminal is a rectangle of 1 mm×24 mm and is disposed in a direction in which the long axis of the rectangle is parallel to the Z axis. The contact face of the fracture terminal is configured to press a measurement point of solid milk 10SX in at least a part thereof. The speed of the fracture terminal pressing the solid milk 10SX is set to 0.5 mm/s. The measurement of the hardness is not limited to the solid milk 10SX and can also be applied to the case of measuring the hardness of a compression molded body of the powdered milk (unhardened solid milk 10SX) described below.

The hardness used herein is a physical quantity of power having a unit of [N (newton)]. The hardness increases as a fractured area of a solid milk sample becomes larger. Herein, the term "fracture" indicates that, when a vertical loading is statically applied to a sample such as the solid milk 10S, the sample is fractured, and a cross-sectional area generated when the sample is fractured is referred to as a "fractured area". That is, the hardness [N] is a physical quantity dependent on the dimension of the solid milk sample. There is mentioned a fracture stress $[N/m^2]$ as a physical quantity not dependent on the dimension of the solid milk sample. The fracture stress is a power applied per unit fractured area at the time of the sample being fractured, is not dependent on the dimension of the solid milk sample, and is an index with which mechanical actions applied to solid milk samples can be compared even between solid milk samples having different dimensions. Fracture stress=Hardness/Fractured area is established. The description has been simply given using the hardness [N] in this specification, but the hardness may be represented as the fracture stress $[N/m^2]$ obtained by dividing the hardness by the fractured area. When the fracture stress is calculated, a fractured face is assumed, and the fracture stress is calculated using the minimum fractured area in the assumed fractured face. For example, in the case of the solid milk 10S, an ideal fractured area is represented by a dimension $\phi \times t$ that is a fractured area in the face including a line passing through the center of the solid milk and parallel to the Z axis. For example, preferred range of the fracture stress of the solid milk 10S is 0.068 $N/mm^2$ or more and 0.739 $N/mm^2$ or less, considering the range of the fractured area.

(Method for Producing Solid Milk 10S)

Next, the method for producing the solid milk 10S will be described. First, a powdered milk which is used as a raw material for the solid milk 10S is produced. In a process of producing a powdered milk, a powdered milk is produced, for example, by a liquid milk preparation step, a liquid milk clarification step, a sterilization step, a homogenization step, a condensation step, a gas dispersion step, and a spray drying step.

The liquid milk preparation step is a step of preparing a liquid milk of the above-described components.

The liquid milk clarification step is a step for removing fine foreign matters contained in the liquid milk. In order to remove these foreign matters, for example, a centrifuge, a filter, and the like may be used.

The sterilization step is a step for killing microorganisms such as bacteria contained in water, milk components, or the like of the liquid milk. Since microorganism, which are considered to be actually contained, are changed depending on the type of the liquid milk, sterilization conditions (a sterilization temperature and a retention time are appropriately set according to the microorganisms.

The homogenization step is a step for homogenizing the liquid milk. Specifically, the particle diameter of solid components such as fat globules contained in the liquid milk is decreased, and these components are uniformly dispersed into the liquid milk. In order to decrease the particle diameter of solid components of the liquid milk, for example, liquid milk may be caused to pass through a narrow gap while being pressurized.

The condensation step is a step condensing the liquid milk before the spray drying step to be described below. In condensation of the liquid milk, for example, vacuum evaporate an evaporator may be used. Condensation conditions are appropriately set within a range that components of the liquid milk are not excessively altered. According to this, a condensed milk can be obtained from the liquid milk. Subsequently, in the presence invention, it is preferable that a gas is dispersed into the condensed liquid milk (condensed milk) and then spray drying is performed. In this case, the moisture content ratio of the condensed milk is, for example, 35% by weight to 60% by weight, and is preferably 40% by weight to 60% by weight and more preferably 40% by weight to 55% by weight. When such a condensed milk is used and a gas is dispersed, decreasing the density of the condensed milk makes the condensed milk bulky, and the condensed milk in a bulky state in this way is sprayed and dried, so that a powdered milk having preferable characteristics when a solid milk is produced can be obtained. Incidentally, in a case where the moisture of the liquid milk is small or the treated amount of the liquid milk to be subjected to the spray drying step is small, this step may be omitted.

The gas dispersion step is a step for dispersing a predetermined gas into the liquid milk. In this case, the predetermined gas the volume of which is, for example, $1 \times 10^{-2}$ times or more and 7 times or less the volume of the liquid milk is dispersed, and the volume thereof is preferably $1 \times 10^{-2}$ times or more and 5 times or less the volume of the liquid milk, more preferably $1 \times 10^{-2}$ times or more and 4 times or less the volume of the liquid milk, and most preferably $1 \times 10^{-2}$ times or more and 3 times or less.

The predetermined gas is preferably pressurized in order to disperse the predetermined gas into the liquid milk. The pressure for pressurizing the predetermined gas is not particularly limited as long as it is within a range enabling the gas to effectively disperse into the liquid milk, but the atmospheric pressure of the predetermined gas is, for example, 1.5 atm or more and 10 atm or less and preferably 2 atm or more and 5 atm or less. Since the liquid milk is sprayed in the following spray drying step, the liquid milk flows along a predetermined flow passage, and in this gas dispersion step, by running the predetermined gas pressurized into this flow passage, the gas is dispersed (mixed) into the liquid milk. By doing so, the predetermined gas can be easily and certainly dispersed into the liquid milk.

As described above, through the gas dispersion step, the density of the liquid milk is decreased, and the apparent volume (bulk) is increased. Incidentally, the density of the liquid milk may be obtained by dividing the weight of the liquid milk by the total volume of the liquid milk at a liquid state and a bubble state. In addition, the density of the liquid milk may be measured using an apparatus measuring a density according to the bulk density measurement (pigment: JIS K 5101 compliant) method based on JIS method.

Therefore, the liquid milk in a state where the predetermined gas is dispersed flows in the flow passage. Herein, the volume flow rate of the liquid milk in the flow passage is preferably controlled to be constant.

In the present embodiment, carbon dioxide (carbon dioxide gas) can be used as the predetermined gas. In the flow passage, the ratio of the volume flow rate of carbon dioxide to the volume flow rate of the liquid milk (hereinafter, the percentage thereof is also referred to as "$CO_2$ mixing ratio [%]") is, for example, 1% or more and 700% or less, preferably 2% or more and 300% or less, more preferably 3% or more and 100% or less, and most preferably 5% or more and 45% or less. As described above, controlling the volume flow rate of the carbon dioxide to be constant to the volume flow rate of the liquid milk, homogeneousness of the powdered milk produced from this liquid milk can be enhanced. However, when the $CO_2$ mixing ratio is too large, the percentage of the liquid milk flowing in the flow passage is decreased so that production efficiency of the powdered milk deteriorates. Therefore, the upper limit of the $CO_2$ mixing ratio is preferably 700%. In addition, the pressure for pressurizing the carbon dioxide is not particularly limited as long as it is within a range enabling the carbon dioxide to effectively disperse into the liquid milk, but the atmospheric pressure of the carbon dioxide is, for example, 1.5 atm or more and 10 atm or less and preferably 2 atm or more and 5 atm or less. Incidentally, by mixing continuously (in-line mixing) carbon dioxide and the liquid milk in a seal-up system, it is possible to certainly prevent bacteria or the like from being mixed so that the hygienic status of the powdered milk can be enhanced (or high cleanliness can be maintained).

In the present embodiment, the predetermined gas used in the gas dispersion step was carbon dioxide gas. Instead of carbon dioxide gas or with carbon dioxide gas, one or two or more gases selected from the group consisting of air, nitrogen ($N_2$), and oxygen ($O_2$) may be used or rare gas (for example, argon (Ar) or helium (He)) may be used. As described above, since various gases can be options, the gas dispersion step can be easily performed by using a gas easily available. In the gas dispersion step, when an inert gas such as nitrogen or rare gas is used, there is no possibility to react with nutritional components of the liquid milk or the like, and thus, it is preferable rather than using air or oxygen since there is less possibility to deteriorate the liquid milk. In this case, the ratio of the volume flow rate of the gas to the volume flow rate of the liquid milk is, for example, 1% or more and 700% or less, preferably 1% or more and 500% or less, more preferably 1% or more and 400% or less, and most preferably 1% or more and 300% or less. For example, according to Bell et al, R. W. BELL, F. P. HANRAHAN, B. H. WEBB: "FOAM SPRAY METHODS OF READILY DISPERSIBLE NONFAT DRY MILK", J. Dairy Sci, 46 (12) 1963. pp. 1352-1356), air having about 18.7 times the volume of non-fat milk is dispersed into non-fat milk to obtain a powdered skimmed milk. In the present invention, by dispersing the gas within the above range, a powdered milk having characteristics preferable for producing a solid milk can be obtained. However, to certainly decrease the density of the liquid milk as a result of having dispersed the predetermined gas into a liquid milk in the gas dispersion step, it is preferable to use, as the predetermined gas, a gas which is easily dispersed into the liquid milk or a gas which is easily dissolved in the liquid milk. Therefore, a gas having a high degree of solubility in water (water solubility) is preferably used, and a gas in which a degree of solubility at 20° C. and one atmosphere in 1 $cm^3$ of water is 0.1 $cm^3$ or more is preferred. Incidentally, carbon dioxide is not limited to a gas and may be dry ice or a mixture of dry ice and a gas. That is, in the gas dispersion step, a solid may be used as long as a predetermined gas can be dispersed into the liquid milk. In the gas dispersion step, carbon dioxide can be rapidly dispersed into the liquid milk in a cooling state by using dry ice, and as a result, a powdered milk having characteristics preferable for producing a solid milk can be obtained.

The spray drying step is a step for obtaining powdered milk (powder) by evaporating moisture in the liquid milk. The powdered milk obtained in this spray drying step is a powdered milk obtained through the gas dispersion step and spray drying step. This powdered milk is bulky as compared to a powdered milk obtained not through the gas dispersion step. The volume of the former is preferably 1.01 times or more and 10 times or less that of the latter, may be 1.02 times or more and 10 times or less or 1.03 times or more and 9 times or less.

In the spray drying step, the liquid milk is spray dried in a state where the predetermined gas is dispersed into the liquid milk in the gas dispersion and the density of the liquid milk becomes small. Specifically, it preferable to spray dry the liquid milk a state where the volume of the liquid milk after dispersing a gas is 1.05 times or more and 3 times or less, preferably 1.1 times or more and 2 times or less as compared to the volume of the liquid milk before dispersing a gas. That is, in the spray drying step, spray drying is performed after finishing the gas dispersion step. However, immediately after finishing the gas dispersion step, the liquid milk is not homogeneous. Therefore, the spray drying step is performed for 0.1 seconds or longer and 5 seconds or shorter, preferably, 0.5 seconds or longer and 3 seconds or shorter after finishing the gas dispersion step. That is, it is sufficient that the gas dispersion step and the spray drying step are continuously performed. By doing so, the liquid milk is continuously placed in a gas dispersion apparatus to disperse a gas, and the liquid milk into which the gas is dispersed is continuously supplied to a spray drying apparatus and can be continuously spray dried.

In order to evaporate moisture, a spray dryer may be used. Herein, the spray dryer includes a flow passage for flowing a liquid milk, a pressuring pump pressuring the liquid milk for flowing the liquid milk along the flow passage, a dry chamber having a wider room than that of the flow passage connecting to an opening of the flow passage, and a spraying apparatus (a nozzle, an atomizer, or the like) set at the opening of the flow passage. Further, the spray dryer transfers the liquid milk by the pressuring pump toward the dry chamber along the flow passage to be the above volume flow rate, the condensed milk is diffused by the spraying apparatus inside the dry chamber in the vicinity of the opening of the flow passage, and the liquid milk in a liquid drop (atomization) state is dried inside the dry chamber at a high temperature (for example, hot wind). That is, moisture is removed by drying the liquid milk in the dry chamber, and as a result, the condensed milk becomes a solid of a powder state, namely, a powdered milk. Incidentally, the moisture amount or the like in the powdered milk is adjusted by appropriately setting the drying condition in the drying chamber, so that it makes the powdered milk less likely to cohere. In addition, by using the spraying apparatus, the surface area per unit volume of liquid drop is increased so that drying efficiency is enhanced, and at the same time, the particle diameter or the like of the powdered milk is adjusted.

Through the steps as described above, a powdered milk suitable for producing a solid milk can be produced.

The powdered milk obtained as described above is compression molded to form a compression molded body of the powdered milk. Next, the obtained compression molded body of the powdered milk is subjected to a hardening treatment including a humidification treatment and a drying treatment. As described above, the solid milk 10S can be produced.

In the step of compression molding the powdered milk, a compression means is used. The compression means is, for example, a pressurization molding machine such as a tablet press or a compression testing apparatus. The tablet press is an apparatus including a die serving as a mold in which a powdered milk is input and a punch capable of punching to the die. The compression molding step by the tablet press will be described below.

Figure 4:
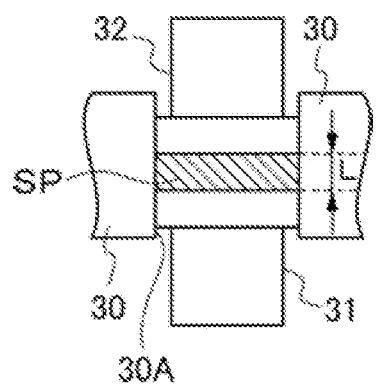
FIG. 4 is an explanatory view describing positions of a slide plate, an upper punch, and a lower punch of a tablet press.

FIG. 4 is an explanatory view describing positions of a slide plate, an upper punch, and a lower punch of a tablet press. In the compression molding zone of the tablet press, a lower punch 31 is disposed below a die 30A of a slide plate 30 to be vertically movable by an actuator. In addition, an upper punch 32 is disposed above the die 30A of the slide plate 30 to be vertically movable by an actuator. FIG. 4 illustrates the position in which the lower punch 31 and the upper punch 32 are inserted into the die 30A of the s plate 30 and then the lower punch 31 and the upper punch 32 approach to each other closest. At this position, a distance between the lower punch 31 and the upper punch 32 is the final punch distance L. An inner surface of the die 30A of the slide plate 30, an upper end face of the lower punch 31, and a lower end face of the upper punch 32 constitute compression molding mold. For example, a powdered milk is supplied to a concave portion configured by the inner surface of the die 30A of the slide plate 30 and an upper of the lower punch 31, the upper punch 32 is hit from the upper side of the die 30A to apply a compression pressure to the powdered milk, the powdered milk is compression molded in a space SP surrounded by the inner surface of the die 30A of the slide plate 30, the upper end face of the lower punch 31, and the lower end face of the upper punch 32, and thus a compression molded body of the powdered milk can be obtained.

The actuator driving the lower punch 31 and the upper punch 32 up and down is configured, for example, by a servomotor. In the present embodiment, the speed of a servomotor as the actuator can be changed to change the compression speed at the time of compression molding, that is, the moving speeds of the lower punch 31 and the upper punch 32, as will be described below in detail. The actuator is not limited to a servomotor, and the technique to change the moving speeds of the lower punch 31 and the upper punch 32 is not limited thereto. For example, it is also possible to use an oil hydraulic cylinder or the like. In addition, at the time of compression molding, the lower punch 31 and the upper punch 32 may be moved in the direction to approach each other, or it is also possible that one side is fixed, and only the other is moved.

A step of performing compression molding while changing a compression speed at the time of compression molding, that is, a moving speed of the lower punch 31 and the upper punch 32 will be described. At the time of this compression molding, the compression speed at which the upper end face of the lower punch 31 and the lower end face of the upper punch 32 approach to each other is changed (switched). That is, a first compression is first performed at a first compression speed $V_1$, and, following the first compression, a second compression is performed at a second compression speed $V_1$. In the present embodiment, the second compression speed $V_2$ is set to be lower than the first compression speed $V_1$.

The compression distances of the first compression and the second compression are, in this example, as illustrated in FIG. 4, based on the state at the completion of the second compression, that is, at the completion of the entire compression steps. Compression by the lower punch 31 and the upper punch 32 is performed until the punch distance between the upper end face of the lower punch 31 and the lower end face of the upper punch 32 reach the final punch distance L. The final punch distance L is the final thickness of the compression molded body of the powdered milk in the of being compressed through the entire compression steps. This final punch distance L is determined considering that the compression molded body the powdered milk expands upon the release of compression, and is smaller than the desired thickness of the compression molded body of the powdered milk or the same as the desired thickness.

The tablet press of the embodiment is controlled during the changeover between the first and second compression so that both sides of the lower punch 31 and upper punch 32 are in close contact with the compressed body and the pressure on the compressed body is not relieved. On the other hand, in the known tablet press (e.g., JP-A-2008-290145), the pressure is controlled to relieved once after preload is applied for the purpose of releasing the air contained in the compressed body and then the main pressure is applied to mold the compressed body. The tablet press used in the embodiment differs from the existing tablet presses in that it compresses the compressed body without releasing the pressure between the first and second compressions and by bringing both sides of the lower and upper punches 31 and 32 in close contact with the compressed body, thus allowing sufficient hardness of the compressed body.

Figure 5:
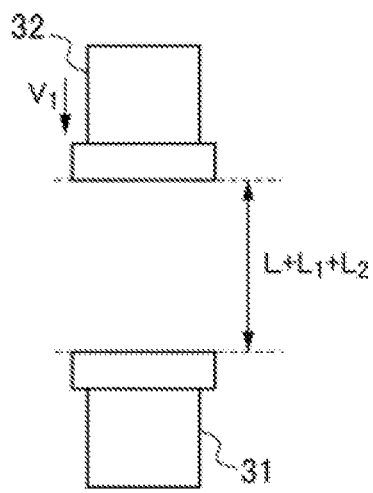
FIG. 5 is an explanatory view describing positions of the upper punch and the lower punch at the start of a first compression.
Figure 6:
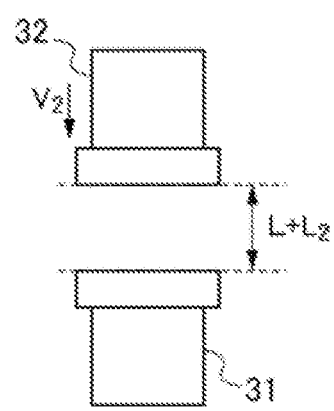
FIG. 6 is an explanatory view describing positions of the upper punch and the lower punch at the completion of the first compression and at the start of a second compression.

FIG. 5 illustrates positions of the lower punch and the upper punch at the start of the first compression. FIG. 6 illustrates positions of the lower punch and the upper punch at the completion of the first compression and at the start of the second compression. Compression from the state of the punch distance illustrated in FIG. 5 ($L+L_1+L_2$) to the state of the punch distance illustrated in FIG. 6 ($L+L_2$) is the first compression. In addition, compression from the state of the punch distance illustrated in FIG. 6 ($L+L_2$) to the state of the final punch distance L illustrated in FIG. 4 is the second compression.

The compression distance of the first compression is the distance $L_1$ that the punch distance decreases in the first compression. The second compression distance of the second compression is the distance $L_2$ that the punch distance decreases second compression. Since the second compression is performed following the first compression without releasing the compression, the second compression distance $L_2$ is the compression distance from the punch distance ($L+L_2$) compressed in the first compression to the final punch distance (L).

The rate of change in the punch distance in the first compression is the first compression speed $V_1$, and the rate of change in the punch distance in the second compression is the second compression speed $V_2$. Incidentally, in a case where the rate of change in the punch distance varies during the first compression or the second compression, the average rate is defined as the first compression speed $V_1$ or the second compression speed $V_2$.

When the second compression is performed after the first compression at the second compression speed $V_2$ that is lower than the first compression speed $V_1$, as compared with a case where the compression is performed at the same compression speed as the first compression speed $V_1$ with the same compression distance ($L_1+L_2$), the hardness of the compression molded body of the powdered milk is increased and thus resistance to breakage can be secured. Moreover, since the second compression is performed continuously to the first compression and the second compression distance $L_2$ can be shortened, production can be performed with further improved production efficiency while having a high strength at the same level as that in the case of performing production only at the second compression seed $V_2$.

In the present embodiment, in order to efficiently enhance the hardness of the compression molded body of the powdered milk, the mode of the second compression, that is the combination of the second compression speed $V_2$ with the second compression distance $L_2$, is determined in such a manner to satisfy the second compression conditions under which, upon the compression of the compression molded body of the powdered milk from the state of being compressed in the first compression, the compression molded body of the powdered milk is compressed to such a state that the rate of change in the hardness of the compression molded body of the powdered milk relative compression distance decreases.

The present inventors have examined compression molded bodies of the powdered milk obtained from various combinations of the first compress speed $V_1$, the first compression distance $L_1$, the second compression speed $V_2$, and the second compression distance $L_2$. As a result, they have found that when the second compression speed $V_2$ is set to be lower than the first compression speed $V_1$, there exists a specific point at which the rate of change in the hardness of a compression molded body of the powdered milk (increase rate) relative to change in the second compression distance $L_2$ decreases (hereinafter referred to as "hardness specific point"). In addition, the inventors have also found that the second compression distance $L_2$ corresponding to the hardness specific point changes with the first compression speed $V_1$ and is also affected by the second compression speed $V_2$.

The hardness specific point exists presumably because of the change from a compression state where the rearrangement of particles of the powdered milk in the inner part of the compression molded body of the powdered milk is dominant to another compression state where plastic deformation in the inner part of the compression molded body of the powdered milk is dominant. In addition, presumably, because an increase in the first compression speed $V_1$ increases the energy required for plastic deformation in the inner part of the compression molded body of the powdered milk, the second compression distance $L_2$ corresponding to the hardness specific point changes according to the first compression speed $V_1$, and also such a second compression distance $L_2$ is affected by the second compression speed $V_2$.

Based on the above findings, the second compression is performed so as to satisfy the second compression conditions, whereby the hardness of the compression molded body of the powdered milk is efficiently and significantly improved while suppressing an increase in the compression time.

It is also preferable that the compression speed ratio ($=V_1/V_2$), which is the ratio of the first compression speed $V_1$ to the second compression speed $V_2$, is set to 5 or more. When the compression speed ratio is set to 5 or more, the hardness of the compression molded body of the powdered milk can be significantly increased.

Preferably, the first compression speed $V_1$ is set in the range of 1.0 mm/s or more and 100.0 mm/s or less, and the first compression distance $L_1$ is set in the range of 5.0 mm or more and 10.0 mm or less, and the second compression speed $V_2$ is set in the range of 0.25 mm/s or more and 50.0 mm/s or less, and the second compression distance $L_2$ is set in the range of 0.2 mm or more 1.6 mm or less.

The configuration of the tablet press described above is an example, and the configuration is not limited as long as compression can be performed at different compression speeds between the first compression and the second compression. In addition, although compression to the final thickness is performed in the second compression in this example, it is also possible to perform further compression at a rate changed from the second compression speed following the second compression. In this case, the compression molded body of the powdered milk is compressed to the final thickness by the compression later than the second compression.

The configuration of the tablet press other than the above-described configuration is, for example, the same of the tablet press described in PTL 3. For example, the die 30A of the slide plate in which the compression molding has been performed moved to a removal zone. In the removal zone of the tablet press, the lower punch 31 and the upper punch 32 are removed from the die 30A of the slide plate 30, and the compression molded body of the powdered milk is extruded by an extrusion part. The extruded compression molded body of the powdered milk collected by a collection tray. In the tablet press, a powdered milk supply part to the die 30A of the slide plate 30 is, for example, realized by an apparatus including a funnel supplying a powdered milk from a bottom opening to the die 30A.

In the step of compression molding the powdered milk, the ambient temperature is not particularly limited, and may be, for example, room temperature. Specifically, the ambient temperature is, for example, 5° C. to 35° C. The ambient humidity is, for example, 0% RH to 60% RH. The compression pressure is, for example, 1 MPa to 30 MPa, and preferably 1 MPa to 20 MPa. In particular, at the time of solidifying the powdered milk, it is preferable that the compression pressure is adjusted within a range of 1 MPa to 30 MPa and the hardness of the compression molded body of the powdered milk is controlled within a range of 4 N or more and less than 20 N. According to this, it is possible to produce a high utility solid milk 10S having convenience (easy handleability). Incidentally, the compression molded body of the powdered milk has such a hardness (for example, 4 N or more) that the shape of the compression molded body of the powdered milk is not collapsed in at least the subsequent humidification step and drying step. For example, a preferred range of the fracture stress of the compression molded body of the powdered milk is 0.014 N/mm$^2$ or more and less than 0.068 N/mm$^2$, considering the range of the fractured area.

By performing the compression molding while changing the compression speed between the first compression and the second compression as described above, a compression molded body of the powdered milk in which the specific surface area voxel ratio profile in the depth direction from the surface to the inner part is as follows can be produced Herein, the average value A of the specific surface area voxel ratio in the region a is more than 0.406 and less than 0.420. In addition, the average value C of the specific surface area voxel ratio in the region c is more than 0.414 and less than 0.434. The average value C of the specific surface area voxel ratio in the region c is larger than the average value A of the specific surface area voxel ratio in the region a. The average value B of the specific surface area voxel ratio of the region b is a value from about the average value A of the specific surface area voxel ratio of the region a to about the average value C of the specific surface area voxel ratio of the region c.

The humidification treatment is a step of subjecting the compression molded body of the powdered milk obtained by the compression molding step to the humidification treatment. When the compression molded body of the powdered milk is humidified, tackiness is generated on the surface of the compression molded body of the powdered milk. As a result, some of the powder particles in the vicinity of the surface of the compression molded body of the powdered milk become a liquid or a gel and are cross-linked to each other. Then, by performing drying in this state, the strength in the vicinity of the surface of the compression molded body of the powdered milk can be increased as compared to the strength of the inner part. The degree of cross-linking (degree of broadening) is adjusted by adjusting time at which the compression molded body of the powdered milk is put under a high-humidity environment (humidification time), and according to this, the hardness (for example, 4 N or more and less than 20 N) of the compression molded body of the powdered milk before the humidification step (unhardened solid milk 10S) can be increased to a target hardness (for example, 40 N) necessary as the solid milk 10S. However, the range (width) of the hardness that can be increased by adjusting the humidification time is limited. That is, when the compression molded body of the powdered milk is transported by a belt conveyer or the like to humidify the compression molded body of the powdered milk obtained after the compression molding, if the hardness of the compression molded body of the powdered milk is not sufficient, the shape of the solid milk 10S is not kept. In addition, if the hardness of the compression molded body of the powdered milk is too high during the compression molding, only the solid milk 10S having a small porosity and poor solubility is obtainable. Therefore, it is preferable to perform the compression molding so that the hardness of the compression molded body of the powdered milk before the humidification step (unhardened solid milk 10S) is sufficiently high and the solubility of the solid milk 10S is sufficiently kept.

In the humidification treatment, a humidification method of the compression molded body of the powdered milk is not particularly limited, and for example, a method of placing a compression molded body of the powdered milk under a high-humidity environment, method of directly spraying water or the like to a compression molded body of the powdered milk, a method of blowing steam to a compression molded body of the powdered milk, and the like are mentioned. Examples of humidification means to humidify the compression molded body of the powdered milk include a high-humidity chamber, a sprayer, and steam.

The ambient humidity is, for example, within a range of 60% RH to 100% RH in a case where the compression molded body of the powdered milk is placed under a high-humidity environment. Further, the humidification time is, for example, 5 seconds to 1 hour and the temperature in a high-humidity environment is, for example, 30° C. to 100° C. When the compression molded body of the powdered milk is placed under a high-humidity environment, the temperature can also be set to a temperature higher than 100° C., the ambient humidity is, for example, in a range of 100% RE or less, the humidification time is, for example, 1 second to 10 seconds, and the temperature is, for example, higher than 100° C. and 330° C. or lower.

The moisture amount (hereinafter, also referred to as "amount of humidification") to be added to the compression molded body of the powdered milk in the humidification treatment can be appropriately adjusted. The amount of humidification is preferably 0.5% by weight to 3% by weight of the mass of the compression molded body of the powdered milk obtained aster the compression-molding step. When the amount of humidification is set to less than 0.5% by weight, it is not possible to provide a sufficient hardness (tablet hardness) to the solid milk 10S, which is not preferred. In addition, when the amount of humidification is more than 3% by weight, the compression molded body of the powdered milk is excessively dissolved into a liquid state or a gelled state so that the compression molded body of the powdered milk is deformed from the compression molded shape or is attached to an apparatus such as a belt conveyer during transporting which is not preferable.

The drying treatment is a step for drying the compression molded body of the powdered milk humidified in the humidification treatment. According to this, surface tackiness on the compression molded body of the powdered milk is eliminated so that the solid milk 10S is easily handled. That is, the humidification treatment and the drying treatment correspond to a step of providing desired characteristics or quality as solid milk 10S by increasing the hardness of the compression molded body of the powdered milk obtained after the compression molding.

In the drying treatment, a drying method of the compression molded body of the powdered milk is not particularly limited, and a known method capable of drying the compression molded body of the powdered milk obtained through the humidification treatment can be employed. For example, method of placing the compression molded body of the powdered milk under a low-humidity and high-temperature condition, a method of bringing the compression molded body of the powdered milk into contact with dry air or high-temperature dry air, and the like are mentioned.

In the case of placing the compression molded body of the powdered milk under a low-humidity and high-temperature condition, the humidity is, for example, 0% RH to 30% RH. As described above, it is preferable to set the humidity to as a low level as possible. In this case, the temperature is, for example, 20° C. to 150° C. The drying time is, for example, 0.2 minutes to 2 hours.

When the moisture contained in the solid milk 10S is large, storage stability deteriorates and it is easy for deterioration in the flavor and the discoloration of appearance to progress. Therefore, in the drying step, the moisture content ratio of the solid milk 10S is preferably controlled (adjusted) to be no more than 1% higher or lower than the moisture content ratio of the powdered milk used as a raw material by controlling the conditions such as a drying temperature and a drying time.

The solid milk 10S produced in this way is generally dissolved in warm water and drunk. Specifically, warm water is poured into a container or the like provided with a lid and then the necessary number of pieces of the solid milk 10S are placed therein, or the warm water is poured after the pieces of the solid milk 10S are placed. Then, preferably, the solid milk 10S is rapidly dissolved by lightly shaking the container and drunk in a state with an appropriate temperature. Further, when, preferably, one to several pieces of the solid milk 10S (more preferably one piece of the solid milk 10S) are dissolved in warm water, the volume of the solid milk 10S may be adjusted to be a necessary amount of the liquid milk for one drinking, for example, to be 1 cm$^3$ to 50 cm$^3$. Incidentally, by changing the amount of the powdered milk used in the compression molding step, the volume of the solid milk 10S can be adjusted.

By performing the hardening treatment for the compression molded body of the powdered milk produced by performing the compression molding while changing the compression speed between the first compression and the second compression as described above, a solid milk in which the specific surface area voxel ratio profile in the depth direction from the surface to the inner part is as follows can be produced. Herein, the average value A of the specific surface area voxel ratio in the region a is more than 0.353 and less than 0.391. In addition, the average value C of the specific surface area voxel ratio in the region c is more than 0.390 and less than 0.444. The average value C of the specific surface area voxel ratio in the region c is larger than the average value A of the specific surface area voxel ratio in the region a. The average value B of the specific surface area voxel ratio of the region b is a value from about the average value A of the specific surface area voxel ratio of the region a to about the average value C of the specific surface area voxel ratio of the region c.

(Action and Effect of Solid Milk 10S)

The specific surface area voxel ratio of the solid milk 10S of the present embodiment is configured such that the average value A from the surface of the solid milk 10S to a depth of 2 mm is more than 0.353 and less than 0.391, and the average value C from a depth of 4 mm from the surface of the solid milk 10S to a depth of 6 mm is more than 0.390 and less than 0.444 and is larger than the average value A from the surface to a depth of 2 mm. The solid milk having such a specific surface area voxel ratio profile can be produced by the first compression at the first compression speed $V_1$ and the second compression, which is performed subsequently to the first compression, at the second compression speed $V_2$ that is lower than the first compression speed $V_1$, and can be produced with further improved production efficiency while having a high strength at the same level as that in the case of performing production only with compression at the second compression speed $V_2$. In such a solid milk, by performing the second compression at the second compression speed that is lower than the first compression speed $V_1$ after the first compression at the first compression speed $V_1$, the hardness in the state before hardening is increased so that resistance to breakage can be secured. The solid milk 10S of the present embodiment can maintain high solubility by securing a high porosity while maintaining a sufficient hardness.

(Action and Effect of Compression Molded Body of Powdered Milk)

The specific surface area voxel ratio of the compression molded body of the powdered milk of the present embodiment is configured such that the average value A from the surface of the compression molded body of the powdered milk to a depth of 2 mm is more than 0.406 and less than 0.420, and the average value C from a depth of 4 mm from the surface of the compression molded body of the powdered milk to a depth of 6 mm is more than 0.414 and less than 0.434 and is larger than the average value A from the surface to a depth of 2 mm. The compression molded body of the powdered milk having such a specific surface area voxel ratio profile can be produced by the first compression at the first compression speed $V_1$ and the second compression, which is performed subsequently to the first compression, at the second compression speed $V_2$ that is lower than the first compression speed $V_1$, and can be produced with further improved production efficiency while having a high strength at the same level as that in the case of performing production only with compression at the second compression speed $V_2$. In such a compression molded body of the powdered milk, by performing the second compression at the second compression speed $V_2$ that is lower than the first compression speed $V_1$ after the first compression at the first compression speed $V_1$, the hardness is increased so that resistance to breakage can be secured. The compression molded of the powdered milk of the present embodiment can maintain high solubility by securing a high porosity while maintaining a sufficient hardness.

Second Embodiment

Solid milk is a type of solid food. The first embodiment described above relates the compression molded body of the powdered milk obtained by compression molding the powdered milk and the solid milk obtained by hardening the compression molded body of the powdered milk, but the present invention is not limited thereto. In the present embodiment, the present invention is applied to a compression molded body of a food powder obtained by compression molding the food powder and a solid food obtained by hardening the compression molded body of the food powder.

For the above-described food powder, in addition to the powdered milk, for example, protein powders such as whey protein, soybean protein, and collagen peptide, amino acid powders, and oil and fat-containing powders such as MCT oil can be used. The food powder may be appropriately added with milk sugar or other sugars. Other than milk sugar or other sugars, nutritional components such as fats, proteins, minerals, and vitamins or food additives may be added to the food powder.

Further, the protein powders of the food powder may be milk casein, meat powder, fish powder, egg powder, wheat protein, wheat protein decomposition product, or the like, One kind or two or more kinds of these protein powders may be added.

Further, the whey protein of the food powder is a generic term for proteins other than casein in milk. It may be classified as whey proteins. Whey protein is composed of a plurality of components such as lactoglobulin, lactalbumin, and lactoferrin. When a milk raw material such as milk is adjusted to be acidic, a protein to be precipitated is casein, and a protein not to be precipitated is whey protein. Examples of the powder raw material containing whey proteins include WPC (whey protein concentrate, protein content: 75 to 85% by mass) and WPI (whey protein isolate, protein content: 85% by mass or more). One kind or two or more kinds of these may be added.

Further, the soybean protein (soybean protein) of the food powder may be a protein contained in soybean or may be extracted from soybean. It is also possible to use those purified from raw material soybeans. The purification method is not particularly limited, and a conventionally known method can be used. As such a soybean protein, a powder commercially available as a material for food and drink, a material for medical use, or a supplement food can be used. One kind or two or more kinds of these may be added.

The amino acids contained in the amino acid powders of the food powder are not particularly limited, and examples thereof include arginine, lysine, ornithine, phenylalanine, tyrosine, valine, methionine, leucine, isoleucine, tryptophan, histidine, proline, cysteine, glutamic acid, asparagine, aspartic acid, serine, glutamine, citrulline, creatine, methyllysine, acetyllysine, hydroxylysine, hydroxyproline, glycine, alanine, threonine, and cystine. One kind or two or more kinds of these may be added.

The amino acids contained in the amino acid powder the food powder may be either a natural product or a synthetic product, and a single amino acid or a mixture of a plurality of amino acids can be used. In addition, as the amino acids, not only free amino acids but also salts such as sodium salt, hydrochloride and acetate, and derivatives such as carnitine and ornithine can be used.

In the description herein, the term "amino acids" includes α-amino acids, β-amino acids, γ-amino acids. The amino acids may e either L-form or D-form.

Further, the oils and fats contained in the oil and fat-containing powders of the food powder are animal oils and fats, vegetable oils and fats, and fractionated oils, hydrogenated oils, and transesterified oils thereof, in addition to MCT oil described above. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Further, the sugars of the food powder are, for example, oligosaccharides, monosaccharides, polysaccharides, artificial sweeteners, or the like, in addition to the milk sugar described above. One kind or two or more kinds of these may be added. Oligosaccharides are, for example, milk sugar, cane sugar, malt sugar, galacto-oligosaccharides, fructo-oligosaccharides, lactulose, acid the like. Monosaccharides are, for example, grape sugar, fruit sugar, galactose, and the like. Polysaccharides are, for example, starch, soluble polysaccharides, dextrin, and the like.

Further, as an example of the food additives of the food powder, sweeteners can be exemplified. The sweeteners may be any sweetener commonly used in foods and pharmaceuticals, and may be either a natural sweetener or a synthetic sweetener. The sweeteners are not particularly limited, and example thereof include glucose, fructose, maltose, sucrose, oligosaccharide, sugar, granulated sugar, maple syrup, honey, molasses, trehalose, palatinose, maltitol, xylitol, sorbitol, glycerin, aspartame, advantame, neotame, sucralose, acesulfame potassium, and saccharin.

Further, as an example of the food additives of the food powder, acidulants can be exemplified. The acidulants are not particularly limited, and examples thereof include acetic acid, citric acid, anhydrous citric acid, adipic acid, succinic acid, lactic acid, malic acid, phosphoric acid, gluconic acid, tartaric acid, and salts thereof. The acidulants can suppress (mask) bitterness caused by the type of the amino acids.

Further, the food powder may contain any components such as fats, proteins, minerals, and vitamins as nutritional components.

Examples of the fats include animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

The proteins, for example, milk proteins and milk protein fractions, animal proteins, vegetable proteins, peptides and amino acids of various chain length obtained by decomposing those proteins with enzymes etc., and the like. One kind or two or more kinds of these may added. Milk proteins are, for example, casein, whey proteins (α-lactoalbumin, β-lactoglobulin, and the like), for example, whey protein concentrate (WPC), whey protein isolate (WPI), and the like. Examples of the animal proteins include egg protein (egg powder), meat powder, and fish powder. Examples of the vegetable proteins include soybean protein and wheat protein. Examples of the peptide include a collagen peptide. Examples of the amino acids include taurine, cystine, cysteine, arginine, and glutamine. One kind or two or more kinds of these may be added.

Examples of the minerals include iron, sodium, potassium, calcium, magnesium, phosphorus, chlorine, zinc, iron, copper, and selenium. One kind or two or more kinds of these may be added.

Examples of the vitamins include vitamin A, vitamin D, vitamin E, vitamin K, vitamin B1, vitamin B2, vitamin B6, vitamin B12, vitamin C, niacin, folic acid, pantothenic acid, and biotin. One kind or two or more kinds of these may be added.

Examples of other food materials include cocoa powder, cacao powder, chocolate powder, microorganism powder containing useful microorganisms such as lactic acid bacteria and bifidobacteria, milk fermented ingredient powder made from a culture obtained by adding microorganisms to milk and fermenting the mixture, cheese powder having cheese as a powder, functional food powder having functional food as a powder, and total nutrition food powder having total nutrition food as a powder. One kind or two or more kinds of these may be added.

The solid food according to the present invention may be in the form of a food for daily ingestion, a health food, health supplement food, a health functional food, a food for specified health use, a nutrient functional food, a supplement, a function-indicating food, or the like.

A compression molded body of the food powder can be formed by compression molding the food powder into a desired shape. A solid food can be formed by hardening the obtained compression molded body of the food powder. The solid food can be produced by performing the same compression molding step and hardening step as those in the first embodiment, except that the above-described food powder is used as a raw material. That is, in the compression molding step, first, the first compression of the first compression distance $L_1$ is performed at the first compression speed $V_1$, and subsequently to this first compression, the second compression of the second compression distance $L_2$ is performed at the second compression speed $V_2$ that is lower than the first compression speed $V_1$.

As for the compression molded body of the food powder obtained by compression molding the food powder and the solid food obtained by hardening the compression molded body of the food powder, the hardness can be measured using the hardness tester described in the first embodiment. A preferred hardness of the compression molded body of the food powder is 4 N or more and less than 20 N, and a preferred hardness of the solid food is 20 N or more and 100 N or less. In addition, a preferred fracture stress of the compression molded body of the food powder is 0.014 $N/mm^2$ or more and less than 0.068 $N/mm^2$. A preferred fracture stress of the solid food is 0.068 $N/mm^2$ or more and 0.739 $N/mm^2$ or less, considering the range of the fractured area.

In the solid food of the present embodiment, the specific surface area voxel ratio profile in the depth direction from the surface to the inner part is as follows. Regarding a depth from the surface to the inner part, similarly to the first embodiment, a region from the surface of the solid food to a depth of 2 mm is designated as a region a, a region from a depth of 2 mm from the surface of the solid food to a depth of 4 mm is designated as a region b, and a region from a depth of 4 mm from the surface of the solid food to a depth of 6 mm is designated as a region c. Regarding the specific surface area voxel ratio of the solid food, an average value A of the region a is smaller than an average value C of the region c. In addition, a rate of decrease (C−A)/C×100 of the specific surface area voxel ratio obtained by dividing a difference (C−A) between the average value C of the region c and the average value A of the region a by the average value C of the region c is 9.5% or less. (C−A)/C×100 exceeds 0%. This means that the average value C of the region c is larger than the average value A of the region a.

The rate of decrease (C−A)/C×100 of the specific surface area voxel ratio of the solid food obtained by dividing a difference (C−A) between the average value C of the region c and the average Value A of the region a by the average value C of the c is 9.5% or less, preferably 9.0% or less, and ever more preferably 8.5% or less.

When the average value A of the specific surface area voxel ratio in the region a of the solid food is smaller than the average value C of the specific surface area voxel ratio in the region C, it is found that raw material powders are in closer contact with each other and in a dense state in the vicinity of the surface (from the surface to a depth of 2 mm) than in the inner part of the solid food (from a depth of 4 mm from the surface to a depth of 6 mm). From this, it is found that the porosity is smaller in the vicinity of the surface. (C−A) that is the numerator of the rate of decrease (C−A)/C×100 of the specific surface area voxel ratio corresponds to a change amount of the surface area of the inner part from the vicinity of the surface. The rate of decrease (C−A)/C×100 of the specific surface area voxel ratio obtained by dividing (C−A) by the average value C of the specific surface area voxel ratio of the inner part physical quantity clearly showing a change of the specific surface area voxel ratio of the inner part from the surface of the solid food.

The small specific surface area voxel ratio means that particles coalesce by the effect compression or the hardening treatment, and as a result, the specific surface area is decreased, and this means that the contact point or contact region of the particles by coalescence is increased so that the strength of the molded body is increased. In this regard, the specific surface area voxel ratio is small, the surface is not excessively compressed, and the vicinity of the center can be compressed to a necessary and sufficient degree, and in this way, a difference in specific surface area voxel ratio between the surface side and the inner side becomes small.

When the compression molding step is performed only at the first compression speed $V_1$ that is a high speed in the production process of the solid food, the pressure propagation between particles is mainly in the normal direction of the pressurization direction; on the other hand, the pressure propagation time to a direction tangential to pressurization is not secured, and the inner part is not compressed, so that the particle contact face mainly in the vicinity of the surfaces increased, and as a result, the difference (C−A) between C and A is increased and the rate of decrease (C−A)/C×100 of the specific surface area voxel ratio exceeds 9.5%. In addition, when the compression molding step is performed only at the second compression speed $V_2$ that is a low speed, since the pressure sufficiently propagates to the normal direction and the tangential direction of pressurization, the compression is performed from the surface to the inner part, but the surface is further compressed, and the rate of decrease (C−A)/C×100 of the specific surface area voxel ratio exceeds 9.5%. In the present embodiment, the compression molding is performed by combining the first compression at the first compression speed $V_1$ and the second compression the second compression speed $V_2$, the surface is not excessively compressed, and the vicinity of the center can be compressed to a necessary and sufficient degree by properly adjusting the pressure propagation balance at the time of compression (the normal direction and the tangential direction), the specific surface area voxel ratio is smaller than in the case of only the first compression speed $V_1$, a difference in specific surface area voxel ratio between the surface side and the inner side is small, and (C−A)/C×100 of the solid food after hardening is 9.5% or less.

The solid food of the present embodiment can be produced by the first compression at the first compression speed $V_1$ and the second compression, which is performed subsequently to the first compression, at the second compression speed $V_2$ that is lower than the first compression speed $V_1$, and can be produced with further proved production efficiency while having a high strength at the same level as that in the case of performing production only with compression at the second compression speed $V_2$. In such a solid food, by performing the second compression at the second compression speed $V_2$ that is lower than the first compression speed $V_1$ after the first compression at the first compression speed $V_1$, the hardness in the state before hardening is increased so that resistance to breakage can be secured. The solid food of the present embodiment can maintain high solubility by securing a high porosity while maintaining a sufficient hardness.

The specific surface area voxel ratio of the compression molded body of the food powder of the present embodiment is also the same as that of the solid food although being different in the terms of numerical value. Regarding a depth from the surface to the inner part, similarly to the above description, a region from the surface of the compression molded body of the food powder to a depth of 2 mm is designated as a region a, a region from a depth of 2 mm from the surface of the compression molded body of the food powder to a depth of 4 mm is designated as a region b, and a region from a depth of 4 mm from the surface of the compression molded body of the food powder to a depth of 6 mm is designated as a region c. Regarding the specific surface area voxel ratio of the compression molded body of the food powder, an average value A of the region a is smaller than an average value C of the region c. In addition, a rate of decrease (C−A)/C×100 of the specific surface area voxel ratio obtained by dividing a difference (C−A) between the average value C of the region c and the average value A of the region a by the average value C of the region c is 1.8% or less. The physical significance of (C−A) and the rate of decrease (C−A)/C×100 of the specific surface area voxel ratio is the same as that in the case of the solid food.

The rate of decrease (C−A)/C×100 of the specific surface area voxel ratio of the compression molded body of the food powder obtained by dividing a difference (C−A) between the average value C of the region c and the average value A of the region a by the average value C of the region c is 1.8% or less, preferably 1.6% or less, and even more preferably 1.4% or less.

When the compression molding step is performed only at the first compression speed $V_1$ that is a high speed in the production process of the compression molded body of the food powder, the pressure propagation between particles is mainly in the normal direction of the pressurization direction; on the other hand, the pressure propagation time to a direction tangential to pressurization is not secured, and the inner part is not compressed, so that the particle contact face mainly in the vicinity of the surface is increased, and as a result, the difference (C−A) between C and A is increased and (C−A)/C×100 is more than 1.8%. In addition, when the compression molding step is performed only at the second compression speed $V_2$ that is a low speed, since the pressure sufficiently propagates to the normal direction and the tangential direction of pressurization, the compression is performed from the surface to the inner part, but the surface is further compressed, and (C−A)/C×100 exceeds 1.8%. In the present embodiment, the compression molding is performed by combining the first compression at the first compression speed $V_1$ and the second compression at the second compression speed $V_2$, the surface is not excessively compressed, and the vicinity of the center can compressed to a necessary and sufficient degree by properly adjusting the pressure propagation balance at the time of compression (the normal direction and the tangential direction), the specific surface area voxel ratio is smaller than in the case of only the first compression speed $V_1$, a difference in specific surface area voxel ratio between the surface side and the inner side is small, and (C−A)/C×100 of the compression molded body of the food powder is 1.8% or less. In addition, (C−A)/C×100 exceeds 0%. This means that the average value C of the region c is larger than the average value A of the region a.

The compression molded body of the food powder of the present embodiment can be produced by the first compression at the first compression speed $V_1$ and the second compression, which is performed subsequently to the first compression, at the second compression speed $V_2$ that is lower than the first compression speed $V_1$, and can be produced with further improved production efficiency while having a high strength at the same level as that in the case of performing production only with compression at the second compression speed $V_2$. In such a compression molded body of the food powder, by performing the second compression at the second compression speed $V_2$ that is lower than the first compression speed $V_1$ after the first compression at the first compression speed $V_1$, the hardness is increased so that resistance to breakage can be secured. The compression molded body of the food powder of the present embodiment can maintain high solubility by securing a high porosity while maintaining a sufficient hardness.

EXAMPLE (Preparation of Example)

A round column-shaped solid milk sample having a diameter of 11.28 mm and a thickness of 12 mm was prepared as Example. The sizes of the die and the punch of the tablet press were adjusted to obtain such a size, and 0.83 g of powdered milk was compression molded to form a compression molded body of the powdered milk. In the compression molding, the first compression in which the first compression distance $L_1$ was set to 5 to 15 mm and the first compression speed $V_1$ was set to 1 to 150 mm/s was performed and then the second compression in which the second compression distance $L_2$ was set to 0.1 to 1.6 mm and the second compression speed $V_2$ was set to 0.25 to 15 mm/s was performed. Solid milk samples of various combinations within the ranges of the compression distances and the compression speeds described above were prepared, and all the samples were formed while the second compression speed $V_2$ was set to be lower than the first compression speed $V_1$. The compression molded body of the powdered milk obtained above was subjected to the humidification treatment at a humidification temperature of 80° C. and further subjected to the drying treatment at a drying temperature of 80° C. to obtain a solid milk subjected to the hardening treatment. As for the drying time, the time was adjusted so that the amount corresponding to the increased weight at the time of humidification was dried out. The sample of Example could be produced with improved production efficiency as compared to Comparative Example 2 described below by performing two-stage compression of the first compression at the first compression speed $V_1$ and the second compression, which was performed subsequently to the first compression, at the second compression speed $V_2$ that is lower than the first compression speed $V_1$.

(Preparation of Comparative Example 1)

A compression molded body of the powdered milk different only in that the compression molding under the condition of the first compression (high-speed compression) at the first compression speed $V_1$ of Example was performed once as compared to Example, was formed, and a solid milk sample was formed by performing the hardening treatment under the same conditions as those in Example and used as Comparative Example 1.

(Preparation of Comparative Example 2)

A compression molded body of the powdered milk different only in that the compression molding under the condition of the second compression (low-speed compression) at the second compression speed $V_2$ of Example was performed once, as compared to Example, was formed, and a solid milk sample was formed by performing the hardening treatment under the same conditions as those in Example and used as Comparative Example 2.

(Hardness of Each Sample)

The hardness evaluation of each sample of the compression molded bodies of the powdered milk according to Example, Comparative Example 1, and Comparative Example 2 was performed using the above-described load cell tablet hardness tester. In the hardness evaluation, among Example, Comparative Example 1, and Comparative Example 2 described above, samples prepared at $V_1$=120 mm/s, $V_2$=1.2 mm/s, $V_1/V_2$=100, $L_1$=12.6 mm, and $L_2$=0.6 mm were used. The results of the strength evaluation of each sample are shown in Table 1. Herein, as evaluations based on the four-grade scale of A to D, A indicates "hard", B indicates "relatively hard", C indicate "relatively soft", and D indicates "soft". Example was evaluated as A, and the hardness was sufficiently secured. Comparative Example 1 was evaluated as D, and the hardness was insufficient. Comparative Example 2 was evaluated as A, and the hardness was sufficiently secured.

TABLE 1

| Sample | Strength evaluation |
| --- | --- |
| Example | A |
| Comparative Example 1 | D |
| Comparative Example 2 | A |

(Specific Surface Area Voxel Ratio of Each Sample)

The specific surface area voxel ratio profile in the depth direction from the surface was obtained for each sample of the compression molded bodies of the powdered milk and the solid milks according to Example, Comparative Example 1, and Comparative Example 2 described above. Specifically, tomography was performed each depth for each sample using 3-dimension computed tomography (3DCT), and images thus acquired were subjected to image processing to obtain a specific surface area voxel ratio. In order to accurately measure the specific surface area, regarding the imaging condition (voxel), it is necessary to perform imaging at a considerably smaller resolution than an average particle diameter of the powder raw material, and a condition of 1/30 or less of the average particle diameter, or the like is desirable. In the case of a powder raw material having an average particle diameter of 200 μm to 300 μm, it is desirable to perform imaging at a resolution of 10 μm or less. Generally, it is difficult to directly obtain an accurate steric specific surface area from the 3DCT image. In this regard, regarding each voxel of 3DCT (that is the minimum volume element at the time of CT imaging and a value on a regular grid in a three dimensional space), Nv (the total amount of voxel filled with only the solid) and Ns (the total amount of voxel including the interface between solid and the gas) are measured, Ns/Nv (the ratio of the respective total amounts) is considered as a characteristic value proportional to the specific surface area, and this value is defined as the specific surface area voxel ratio. By adopting the voxel ratio, characteristics relating the specific surface area can be compared without the influence of a difference in CT slice region or a difference in resolution. Herein, the average value A from the surface to a depth of 2 mm and the average value C from a depth of 4 mm from the surface to a depth of 6 mm were obtained.

The determination of the number of voxel including the interface can be performed using an image processing software, and for example, the measurement thereof can be performed by dividing the measurement screen into a lattice shape by the minimum voxel dimension and manually counting the number of voxel, or automatically counting the number of voxel in the same procedure with the software. Examples of software can count the number of voxel at the interface include ImageJ (National Institutes of Health (NIH)), DRISHTI (National Computational Infrastructure), VGStudio MAX (Volume Graphics GmbH), and Dragonfly (Object Research Systems). By adopting the voxel ratio, characteristics relating the specific surface area can be compared without the influence of a difference in CT slice region or a difference in resolution.

For the measurement of the specific surface area voxel ratio of the sample of the compression molded body of the powdered milk and the solid milk according to each of Examples and Comparative Examples, high-resolution 3D X-ray microscope (three-dimensional X-ray CT apparatus) (format: nano 3DX) manufactured by Rigaku Corporation was used. As for the measurement environment of the specific surface area voxel ratio, the measurement was performed at a temperature of 24° C. and a humidity of 33% RH.

Herein, the specific surface area voxel ratio is a convenient index for comparing sizes of specific surface areas regardless to the size of the inspection region, and the specific surface area voxel ratio can be converted into the specific surface area by the following formula.

Specific surface area $[mm^{-1}]$={Total amount of voxel including the interface between the solid and the gas in the inspection region: Ns×(voxel value)$^2$ [mm$^2$]}/{Total amount of voxel filled with only the solid in the inspection region: Nv×(voxel value)$^3$ [mm$^3$]}

Figure 7:
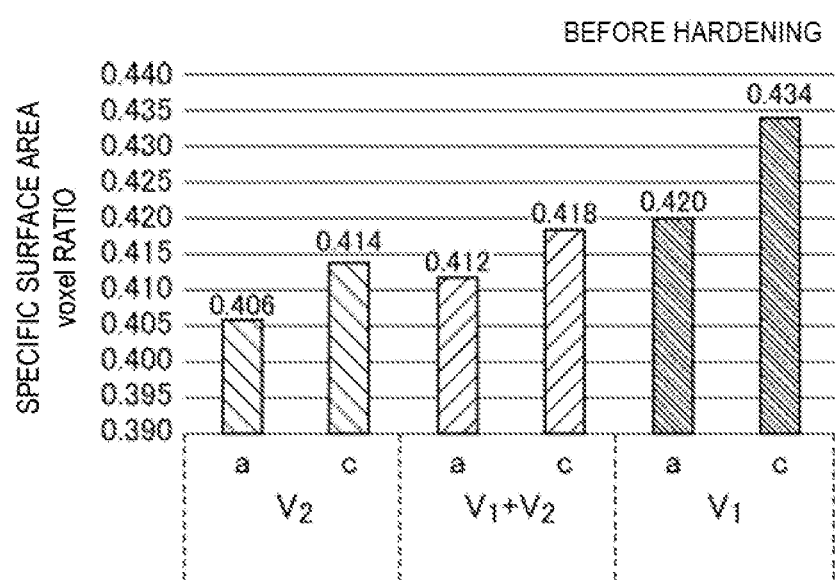
FIG. 7 is a graph showing specific surface area voxel ratios from a surface of a compression molded body of a powdered milk according to each of Example and Comparative Examples 1 and 2 to a depth of 2 mm and from depth of 4 mm from the surface to a depth of 6 mm.

FIG. 7 is a graph showing specific surface area voxel ratios of the region a from the surface of the compression molded body of the powdered milk according to each of Example and Comparative Examples 1 and 2 to a depth of 2 mm and the region c from a depth of 4 mm from the surface to a depth of 6 mm. Example is shown in the section of $V_1+V_2$. Comparative Example 1 is shown in the section of $V_1$. Comparative Example 2 is shown in the section of $V_2$. The bar graph indicated by a in each section is the average value A of the specific surface area voxel ratio of the region a of each sample. In addition, the bar graph indicated by c is the average value C of the specific surface area voxel ratio of the region c of each sample. As shown in FIG. 7, in the region a, the average value A of the specific surface area voxel ratio of the compression molded body of the powdered milk according to Example was a value between the average values A of the specific surface area voxel ratios of Comparative Example 1 and Comparative Example 2. In addition, in the region c, the average value C of the specific surface area voxel ratio of the compression molded body of the powdered milk according to Example was a value between the average values C of the specific Surface area voxel ratios of Comparative Example 1 and Comparative Example 2.

From FIG. 7, the compression molded body of the powdered milk of Example in which the average value A of the specific surface area voxel ratio of the region a is more than 0.406 and less than 0.420 and the average value C of the specific surface area voxel ratio of the region ore than 0.414 and less than 0.434 has a specific surface area voxel ratio profile between Comparative Example 1 formed by only the first compression (high-speed compression) at the first compression speed $V_1$ and Comparative Example 2 formed by only the second compression (low-speed compression) at the second compression speed $V_2$. The compression molded body of the powdered milk having such a specific surface area voxel ratio profile can be formed by performing the compression molding in which the second compression (low-speed compression) at the second compression speed $V_2$ is combined after the first compression (high-speed compression) at the first compression speed $V_1$, the hardness is increased to be a sufficient level as the compression molded body of the powdered milk to secure resistance to breakage and the production efficiency can be improved. In addition, the solid milk can maintain high solubility by securing a high porosity while maintaining a sufficient hardness.

Figure 8:
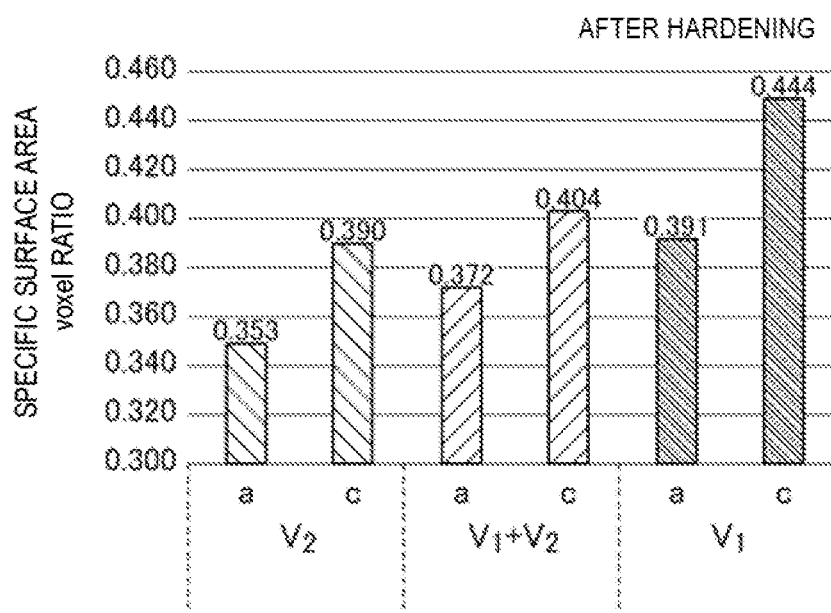
FIG. 8 is a graph show specific surface area voxel ratios from a surface of a solid milk according to each of Example and Comparative Examples 1 and 2 to a depth of 2 mm and from a depth of 4 mm from the surface to a depth of 6 mm.

FIG. 8 is a graph showing specific surface area voxel ratios of the region a from the surface of the solid milk according to each of Example and Comparative Examples 1 and 2 to a depth of 2 mm and the region c from a depth of 4 mm from the surface to a depth of 6 mm. Example is shown in the section of $V_1+V_2$. Comparative Example 1 is shown section of the section of $V_1$. Comparative Example 2 is shown in the section of $V_2$. The bar graph indicated by a in each section is the average value A of the specific surface area voxel ratio of the region a of each sample. In addition, the bar graph indicated by c is the average value C of the specific surface area voxel ratio of the region c of each sample. As shown in FIG. 8, in the region a, the average value A of the specific surface area voxel ratio of the solid milk according to Example was a value between the average values A of the specific surface area voxel ratios of Comparative Example 1 and Comparative Example 2. In addition, in the region c, the average value C of the specific surface area voxel ratio of the solid milk according to Example was a value between the average values C of the specific surface area voxel ratios of Comparative Example 1 and Comparative Example 2.

From FIG. 8, the solid milk of Example in which the average value A of the specific surface area voxel ratio of the region a is more than 0.353 and less than 0.391 and the average value C of the specific surface area voxel ratio of the region c is more than 0.390 and less than 0.444 has a specific surface area voxel ratio profile between Comparative Example 1 formed by only the first compression (high-speed compression) at the first compression speed $V_1$ and Comparative Example 2 formed by only the second compression (low-speed compression) at the second compression speed $V_2$. The solid milk having such a specific surface area voxel ratio profile can be formed by performing the compression molding in which the second compression (low-speed compression) at the second compression speed $V_2$ is combined after the first compression (high-speed compression) at the first compression speed $V_1$ and the hardening treatment. In the solid milk obtained in this way, the hardness is increased to be a sufficient level to secure resistance to breakage and production efficiency can be improved. In addition, the solid milk can maintain high solubility by securing a high porosity while maintaining a sufficient hardness.

(Comparison of Rate of Decrease (C−A)/C×100 of Specific Surface Area Voxel Ratio of Each Sample)

Figure 9:
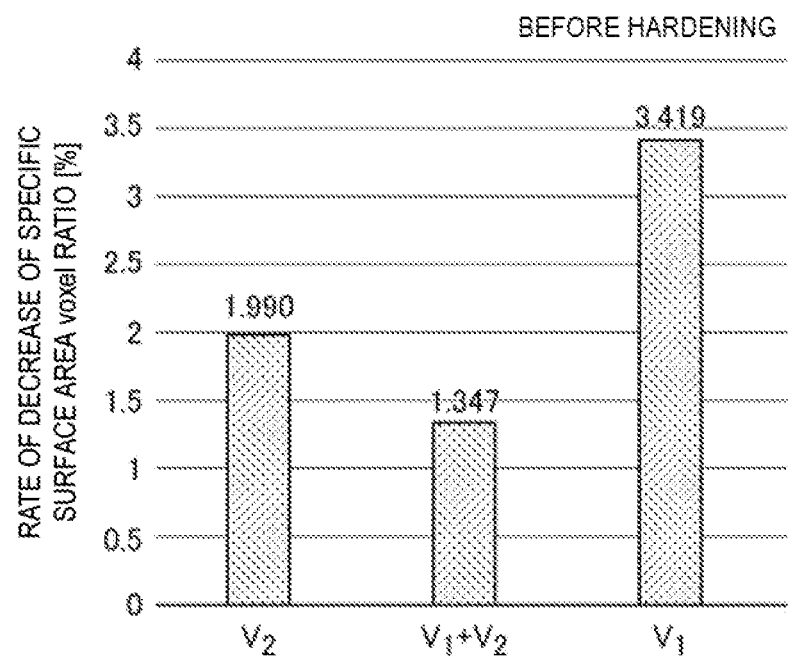
FIG. 9 is a graph showing rates of decrease of specific surface area voxel ratio of the compression molded bodies of the powdered milk according to Example and Comparative Examples 1 and 2.

FIG. 9 is a graph showing rates of decrease of specific surface area voxel ratio of the compression molded bodies of the powdered milk according to Example and Comparative Examples 1 and 2. Regarding the compression molded body of the powdered milk, when a value of the rate of decrease (C−A)/C×100 of the specific surface area voxel ratio was calculated from the average value A of the specific surface area voxel ratio of the region a and the average value C of the specific surface area voxel ratio of the region c of each sample obtained above, the rate of decrease was 1.35% in Example ($V_1+V_2$) and was a value of 1.8% or less. On the other hand, the rate of decrease was 3.42% in Comparative Example 1 ($V_1$) and was more than 1.8%. In addition, the rate of decrease was 1.99% in Comparative Example 2 ($V_2$) and was also more than 1.8%. In Example, although tabletting was performed with high production capability in a short time as compared to Comparative Example 2, a molded body having a high strength was obtainable.

Figure 10:
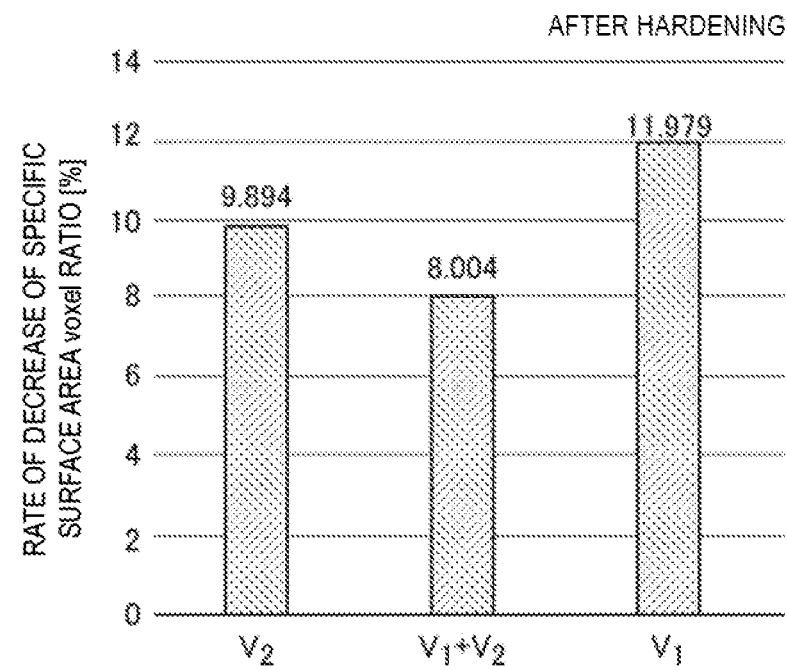
FIG. 10 is a graph showing rates of decrease of specific surface area voxel ratio of the solid milks according to Example and Comparative Examples 1 and 2.

FIG. 10 is a graph showing rates of decrease of specific surface area voxel ratio of the solid milks according to Example and Comparative Examples 1 and 2. Regarding the solid milk, when a value of the rate of decrease (C−A)/C×100 of the specific surface area voxel ratio was calculated from the average value A of the specific surface area voxel ratio of the region a and the average value C of the specific surface area voxel ratio of the region c of each sample obtained above, the rate of decrease was 8.00% in Example ($V_1+V_2$) and was a value smaller than 9.5%. On the other hand, the rate of decrease was 11.98% in Comparative Example 1 ($V_1$) and was more than 9.5%. In addition, the rate of decrease was 9.89% in Comparative Example 2 ($V_2$) and was more than 9.5% similarly to Comparative Example 1. In Example, although tabletting was performed with high production capability in a short time as compared to Comparative Example 2, a molded body having a high strength was obtainable.

The compression molded body of the food powder and the solid food obtained by hardening the compression molded body of the food powder of Example can be produced by compression molding with the first compression at the first compression speed $V_1$ and the second compression, which was performed subsequently to the first compression, at the second compression speed $V_2$ that is lower than the first compression speed $V_1$. The compression molded body the food powder and the solid food can be produced with further improved production efficiency while having a high strength at the same level as that in the case of performing production only with compression at the second compression speed $V_2$. In such a compression molded body of the food powder and a solid food obtained by hardening the compression molded body of the food powder, by performing the second compression at the second compression speed $V_2$ that is lower than the first compression speed $V_1$ after the first compression at the first compression speed $V_1$, the hardness before hardening is increased so that resistance to breakage can be secured, and high solubility can be maintained by securing a high porosity while maintaining a sufficient hardness.

Figure 11:
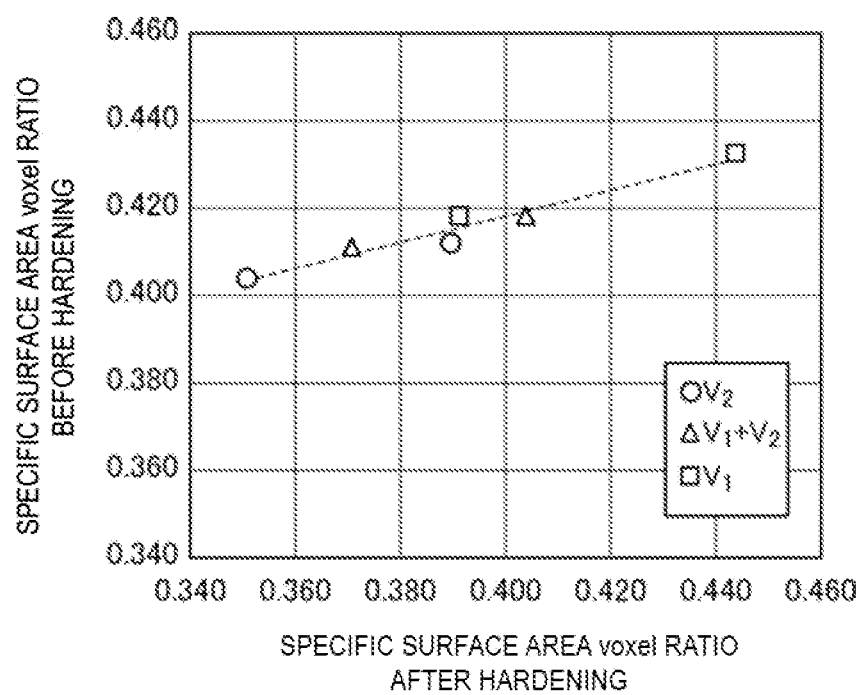
FIG. 11 is a graph showing a correlation between the specific surface area voxel ratios of the compression molded bodies of powdered milk and the specific surface area voxel ratios of the solid milks according to Example and Comparative Examples 1 and 2.

FIG. 11 is a graph ascribing a correlation between an average value of specific surface area voxel ratios the compression molded bodies of the powdered milk and an average value of specific surface area voxel ratios of the solid milks according to Example and Comparative Examples 1 and 2. It was confirmed that the average value of specific surface area voxel ratio of the compression molded body of the powdered milk and the average value of the specific surface area voxel ratio of the solid milk have one-to-one correlation. From this, the specific surface area voxel ratio of the compression molded body of the powdered milk can be speculated from the specific surface area voxel ratio of the solid milk. That is, the state of the compression molded body of the powdered milk can be speculated from the state of the solid milk.

Incidentally, the present disclosure may have the following configuration. When the present disclosure has the following configuration, solid food, a compression molded body of a food powder, and a solid milk can be produced with improved production efficiency while securing resistance to breakage.

(1) A solid food having a solid form obtained by compression-molding a food powder, in which a specific surface area voxel ratio of the solid food is configured such that an average value A from a surface of the solid food to a depth of 2 mm is smaller than an average value C from a depth of 4 mm from the surface of the solid food to a depth of 6 mm, and a rate of decrease (C−A)/C×100 of the specific surface area voxel ratio obtained by dividing a difference (C−A) between the average value C and the average value the average value C is 9.5% or less.

(2) A compression molded body of a food powder having a solid form obtained by compression molding a food powder, which a specific surface area voxel ratio of the compression molded body of the food powder is configured such that an average value A from a surface of the compression molded body of the food powder to a depth of 2 mm smaller than an average value C from a depth of 4 mm from the surface of the compression molded body of the food powder to a depth of 6 mm, and a rate of decrease (C−A)/C×100 of the specific surface area voxel ratio obtained by dividing difference (C−A) between the average value C and the average value A by the average value C is 1.8% or less.

(3) A solid milk having a solid form aired by compression molding a powdered milk, in which a specific surface area voxel ratio of the solid milk is configured such that an average value A from a surface of the solid milk to a depth of 2 mm is more than 0.353 and less than 0.391, and an aver value C from a depth of 4 mm from the surface of the solid milk to a depth of 6 mm is more than 0.390 and less than 0.444 and is larger than the average value A.

(4) A compression molded body of a powdered milk having a solid form obtained compression molding a powdered milk, in which a specific surface area voxel ratio the compression molded body of the powdered milk is configured such that an average value A from a surface of the compression molded body of the powdered milk to a depth of 2 mm is more than 0.406 and less than 0.420, and an average value C from a depth of 4 mm from the surface of the compression molded body of the powdered milk to a depth of 6 mm is more than 0.414 and less than 0.434 and is larger than the average value A.

(5) A solid food having a solid form obtained by compression molding a food powder, in which a hardening treatment is performed on a compression molded body of the food powder obtained by compression molding the food powder so that a specific surface area voxel ratio of the solid food is configured such that an average value A from a surface of the solid food to a depth of 2 mm is smaller than an average value C from a depth of 4 mm from the surface of the solid food to a depth of 6 mm, and a rate of decrease (C−A)/C×100 of the specific surface area voxel ratio obtained by dividing a difference (C−A) between the average value C and average value A by the average value C is 9.5% or less.

(6) A compression molded body of a food powder having a solid form obtained by compression molding a food powder, in which the compression molded body of the food powder is formed by compression molding the food powder so that a specific surface area voxel ratio of the compression molded body of the food powder is configured such that an average value A from a surface of the compression molded body of the food powder to a depth of 2 mm is smaller than an average value C from a depth of 4 mm from the surface of the compression molded body of the food Lewder to a depth of 6 m, and a rate of decrease (C−A)/C×100 of the specific surface area voxel ratio obtained by dividing a difference (C−A) between the average value C and the average value A by the average value C is 1.8% or less.

(7) A solid milk laving a solid form obtained by compression molding a powdered milk, in which a hardening treatment is performed on a compression molded body of the powdered milk obtained compression molding the powdered milk that a specific surface area voxel ratio of the solid milk is configured such that an average value A from a surface of the solid milk to a depth of 2 mm is more than 0.353 and less than 0.391, and an average value C from a depth of 4 mm from the surface of the solid milk to a depth of 6 mm is more than 0.390 and less than 0.444 and is larger than the average value A.

(8) A compresses on molded body of a powdered milk having a solid form obtained by compression molding a powdered milk, in which the compression molded body of the powdered milk is formed by compression molding the powdered milk so that a specific surface area voxel ratio the compression molded body of the powdered milk is configured such that an average value A from a surface of the compression molded body of the powdered milk to a depth of 2 mm is more than 0.406 and less than 0.420, and an average value C from a depth of 4 mm from the surface of the compression molded body of the powdered milk to a depth of 6 mm is more than 0.414 and less than 0.434 and is larger than the average value A.

(9) A solid food having a solid form obtained by compression molding a food powder, in which a fracture stress of the solid food is 0.068 N/mm$^2$ or more and 0.739 N/mm$^2$ or less, and a specific surface area voxel ratio of the solid food is configured such that an average value A from a surface of the solid food to a depth of 2 mm is smaller than an average value C from a depth of 4 mm from the surface of the solid food to depth of 6 mm, and a rate of decrease (C−A)/C×100 of the specific surface area voxel ratio obtained by dividing a difference (C−A) between the average value C and the average value A by the average value C is 9.5% or less.

(10) A compression molded body of a food powder having a solid form obtained by compression molding a food powder, in which a fracture stress of the compression molded body of the food powder is less than 0.068 N/mm$^2$, and a specific surface area voxel ratio the compression molded body of the food powder is configured such that an average value A from a surface of the compression molded body of the food powder to a depth of 2 mm is smaller than an average value C from a depth of 4 mm from the surface of the compression molded body of the food powder to a depth of 6 mm, and a rate of decrease (C−A)/C×100 of the specific surface area voxel ratio obtained by dividing a difference (C−A) between the average value C and average value A by the average value C is 1.8% or less.

(11) A solid milk having a solid form obtained by compression molding a powdered milk, in which a fracture stress of the solid milk is 0.068 N/mm$^2$ or more and 0.739 N/mm$^2$ or less, and a specific surface area voxel ratio of the solid milk is configured such that an average value A from a surface of the solid milk to a depth of 2 mm is more than 0.353 and less than 0.391, and an average value C from a depth of 4 mm from the surface of the solid milk to a depth of 6 mm is more than 0.390 and less than 0.444 and is larger than the average value A.

(12) A compression molded body of a powdered milk having a solid form obtained by compression molding a powdered milk, in which a fracture stress of the compression molded body of the powdered milk is less than 0.068 N/mm$^2$, and a specific surface area voxel ratio of the compression molded body of the powdered milk is configured such that an average value A from a surface of the compression molded body of the powdered milk to a depth of 2 mm is more than 0.406 and less than 0.420, and an average value C from a depth of 4 mm from the surface of the compression molded body of the powdered milk to a depth of 6 mm is more than 0.414 and less than 0.434 and is larger than the average value A.

REFERENCE SIGNS LIST

10: Body
10A: First face
10P: Second face
10C: Lateral face
10S: Solid milk

The invention claimed is:
1. A solid milk having a solid form obtained by compression molding a powdered milk,
wherein a fracture stress of the solid milk is 0.068 N/mm$^2$ or more and 0.739 N/mm$^2$ or less,
a specific surface area voxel ratio of the solid milk is configured such that an average value A from an outer surface of the solid milk to a depth of 2 mm is more than 0.353 and less than 0.391, and
an average value C from a depth of 4 mm from the outer surface of the solid milk to a depth of 6 mm is more than 0.390 and less than 0.444 and is larger than the average value A.

2. A compression molded body of a powdered milk having a solid form obtained by compression molding a powdered milk, wherein a fracture stress of the compression molded body of the powdered milk is 0.014 N/mm² or more and 0.068 N/mm² or less, a specific surface area voxel ratio of the compression molded body of the powdered milk is configured such that an average value A from an outer surface of the compression molded body of the powdered milk to a depth of 2 mm is more than 0.406 and less than 0.420, and an average value C from a depth of 4 mm from the outer surface of the compression molded body of the powdered milk to a depth of 6 mm is more than 0.414 and less than 0.434 and is larger than the average value A.

3. A solid milk having a solid form obtained by compression molding a powdered milk according to claim 1,
wherein the outer surface is in contact with the compression face of the compression device.

4. A solid milk having a solid form obtained by compression molding a powdered milk according to claim 3,
wherein the moisture content ratio of the powdered milk is 1% by weight to 4% by weight.

5. A compression molded body of a powdered milk having a solid form obtained by compression molding a powdered milk according to claim 2,
wherein the outer surface is in contact with the compression face of the compression device.

6. A compression molded body of a powdered milk having a solid form obtained by compression molding a powdered milk according to claim 5,
wherein the moisture content ratio of the powdered milk is 1% by weight to 4% by weight.

\* \* \* \* \*